US012581428B2

(12) United States Patent　　(10) Patent No.:　US 12,581,428 B2
Mueck　　(45) Date of Patent:　Mar. 17, 2026

(54) DYNAMIC SELECTION OF TOLLING PROTECTION MECHANISMS AND MULTI-CHANNEL MANAGEMENT

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 309 days.

(21) Appl. No.: 18/547,218

(22) PCT Filed: Jun. 24, 2021

(86) PCT No.: PCT/US2021/038865
　　§ 371 (c)(1),
　　(2) Date: Aug. 21, 2023

(87) PCT Pub. No.: WO2022/271175
　　PCT Pub. Date: Dec. 29, 2022

(65) Prior Publication Data
　　US 2024/0129861 A1　　Apr. 18, 2024

(51) Int. Cl.
　　*H04W 52/34*　　(2009.01)
(52) U.S. Cl.
　　CPC ................................. *H04W 52/34* (2013.01)

(58) Field of Classification Search
　　CPC . H04W 52/34; H04W 52/367; H04W 52/146; H04W 52/243; H04W 16/10; H04B 15/00; H04L 1/08; H04L 5/0066; H04L 5/0073
　　See application file for complete search history.

(56) References Cited

U.S. PATENT DOCUMENTS

| 10,575,261 | B2 * | 2/2020 | Dinan .................... H04W 24/10 |
| 2018/0146480 | A1 | 5/2018 | Chendamarai Kannan et al. |
| 2018/0317127 | A1 | 11/2018 | Chen et al. |
| 2019/0280763 | A1 * | 9/2019 | Smyth ................ H04B 7/18513 |
| 2020/0100117 | A1 | 3/2020 | Hassan Hussein et al. |
| 2021/0119748 | A1 * | 4/2021 | Damnjanovic ..... H04W 52/146 |

FOREIGN PATENT DOCUMENTS

| EP | 2592769 A1 | 5/2013 |
| WO | 2012177218 A2 | 12/2012 |
| WO | 2020139854 A2 | 7/2020 |
| WO | 2022271175 A1 | 12/2022 |

OTHER PUBLICATIONS

Nov. 24, 2021 (PCT) International Search Report and Written Opinion—App. PCT/US2021/038865.
Feb. 14, 2025 (EP) Search Report—App. 21947340.2.

\* cited by examiner

*Primary Examiner* — John J Lee
(74) *Attorney, Agent, or Firm* — Banner & Witcoff, Ltd.

(57)　　　ABSTRACT
Techniques are disclosed for dynamically selecting out of band emission protection mechanisms to protect the usage of other frequency bands, as well as techniques for managing the scheduling and transmission of safety related messages having different communication latency requirements.

24 Claims, 11 Drawing Sheets

500

640

DYNAMIC SELECTION OF TOLLING PROTECTION MECHANISMS AND MULTI-CHANNEL MANAGEMENT

TECHNICAL FIELD

Aspects described herein generally relate to techniques for dynamically selecting out of band emission protection mechanisms to protect the usage of other frequency bands, as well as techniques for managing the scheduling and transmission of safety related messages having different communication latency requirements.

BACKGROUND

Spurious or out of band emissions from the use of certain wireless channels may cause interference in nearby frequency bands, and therefore wireless standards have been developed that include protection mechanisms for transmissions in certain frequency bands to mitigate such interference. However, additional communication standards developed after such mitigation techniques were developed introduce additional complexities, as the newer communication standards utilize simultaneous device transmissions that were not considered when the earlier mitigation techniques were developed.

Moreover, competing communication standards may share portions of a frequency band including several channels, with each communication standard using the shared frequency bands for the transmission of data such as safety service messages. Each of these competing communication standards may implement safety service message transmissions, but often the receivers that need to decode and process these safety service messages only operate on one of the channels within the frequency band. Therefore, current communication standards that implement the transmission of such safety service messages run the risk of receivers not receiving these safety service messages in a timely manner if not tuned to the same channel as the safety service message transmission.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

This disclosure is divided into two Sections. The first of these two Sections is directed to the dynamic selection of spurious or out of band emission protection mechanisms to ensure adequate protection for communications in certain frequency bands from the transmission of data in other frequency bands. The second Section is directed to transmission scheduling techniques to ensure that safety related messages are received by receivers that may operate on a single channel. Although the techniques described in each respective Section is presented as a separate concept and implementation, this is for ease of explanation, and the techniques described in each of these Sections may be combined such that one or more devices may implement either or both techniques.

Section I—Dynamic Selection of Out of Band Emission Protection Mechanisms

Again, spurious or unwanted out of band emissions from the use of certain frequency bands may cause interference in nearby frequency bands, and thus wireless standards have been developed to mitigate such out of band interference. With respect to the implementation of the techniques as discussed herein, the disclosure largely refers to the use of two different vehicular-based communication protocols in this regard, which are primarily deployed in Europe and used for vehicle-to-vehicle communications as well as communications between vehicles and other devices such as user equipment, intelligent transport system (ITS) stations, etc. Some current communication standards used for this purpose include the ITS G5 communication standard, which is based upon the Institute of Electrical and Electronics Engineers (IEEE) 802.11p standard, the most recent version of which at the time of this writing including the European Telecommunications Standards Institute (ETSI) EN 302 663 V1.2.0, published in November of 2012. Another communication standard includes the 3rd Generation Partnership Project (3GPP) Long-Term Evolution (LTE) Cellular Vehicle-to-Everything (C-V2X) Standard, the most current version of which being GGPP Release 17, published on Dec. 12, 2020.

Figure 2:
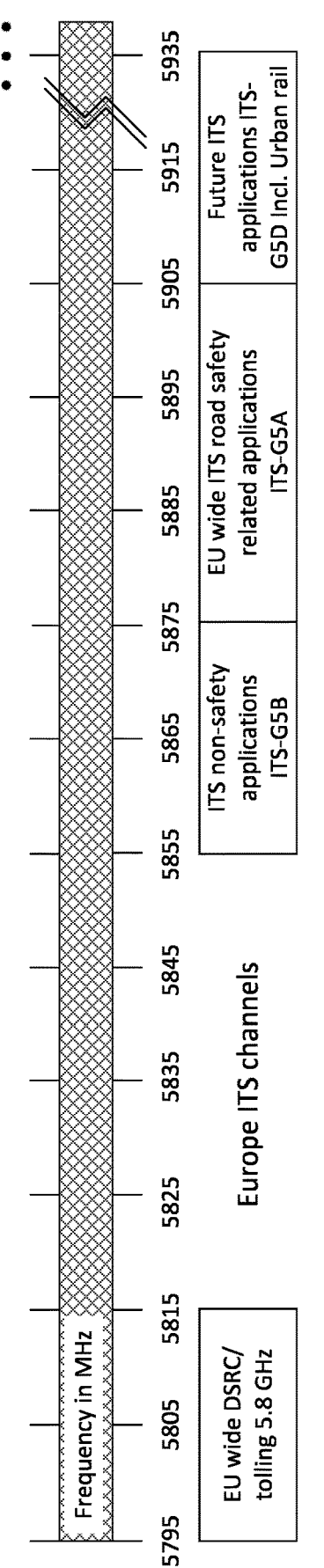
FIG. 2 illustrates an example ITS spectrum, in accordance with the disclosure.

Additional standards for vehicular communication include Dedicated Short-Range Communications (DSRC) in the United States, which includes an allotment of 75 MHz of spectrum in the 5.9 GHz band for ITS communications and is also based upon the IEEE 802.11p standard. It is noted that the U.S.-based DSRC used for ITS is not the same as the DSRC communications used in Europe, as shown in FIG. 2 and referenced in further detail herein, the latter of which references a dedicated usage of the ITS G5 communication standard in a specific frequency band for vehicular tolling purposes.

Although the techniques are described throughout the disclosure in the context of the European communication standards, the disclosure is not limited to the use of these specific communication standards and/or frequency bands. The techniques described herein may implement any suitable type of communication standard and/or frequency bands, and facilitate communications between the various devices as further described herein using any suitable type of communication protocols in accordance with such standards.

Wireless Network Operation

Figure 1:
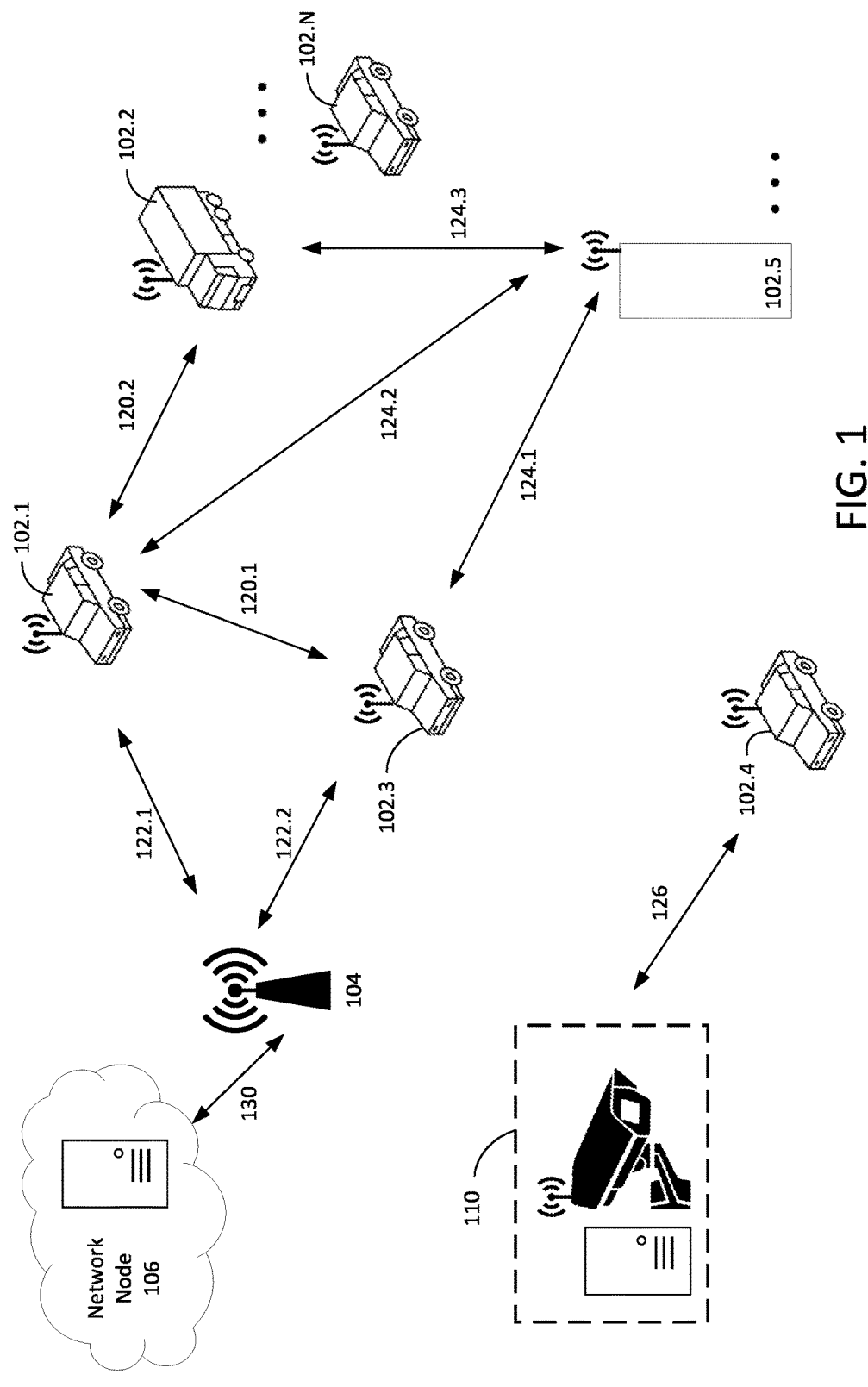
FIG. 1 illustrates an example wireless network, in accordance with the present disclosure.

FIG. 1 illustrates a wireless network, in accordance with the present disclosure. The wireless network 100 as shown in FIG. 1 may include any suitable number of wireless communication devices 102.1-102.N. The wireless communication devices 102.1-102.N may be configured to perform wireless communications with one another (such as via the radio links 120.1, 120.2) and/or with one or more network nodes, which may include the base station 104 as shown in FIG. 1 and/or the network node 106 (such as via the radio links 122.1, 122.2). The wireless communications devices 102.1-102.N may be implemented as part of or otherwise associated with the vehicles as shown. Thus, the wireless communications devices 102.1-102.N may be implemented as a device that is integrated as part of the vehicles 102.1-102.4 or, alternatively, as a device that is separate from the vehicle but mounted in or otherwise contained within the vehicle. Such devices may include any suitable type of user equipment (UE) such as a mobile phone, an in-vehicle ITS station (ITS-S), components of the vehicle configured to perform wireless communications, etc.

Figure 5:
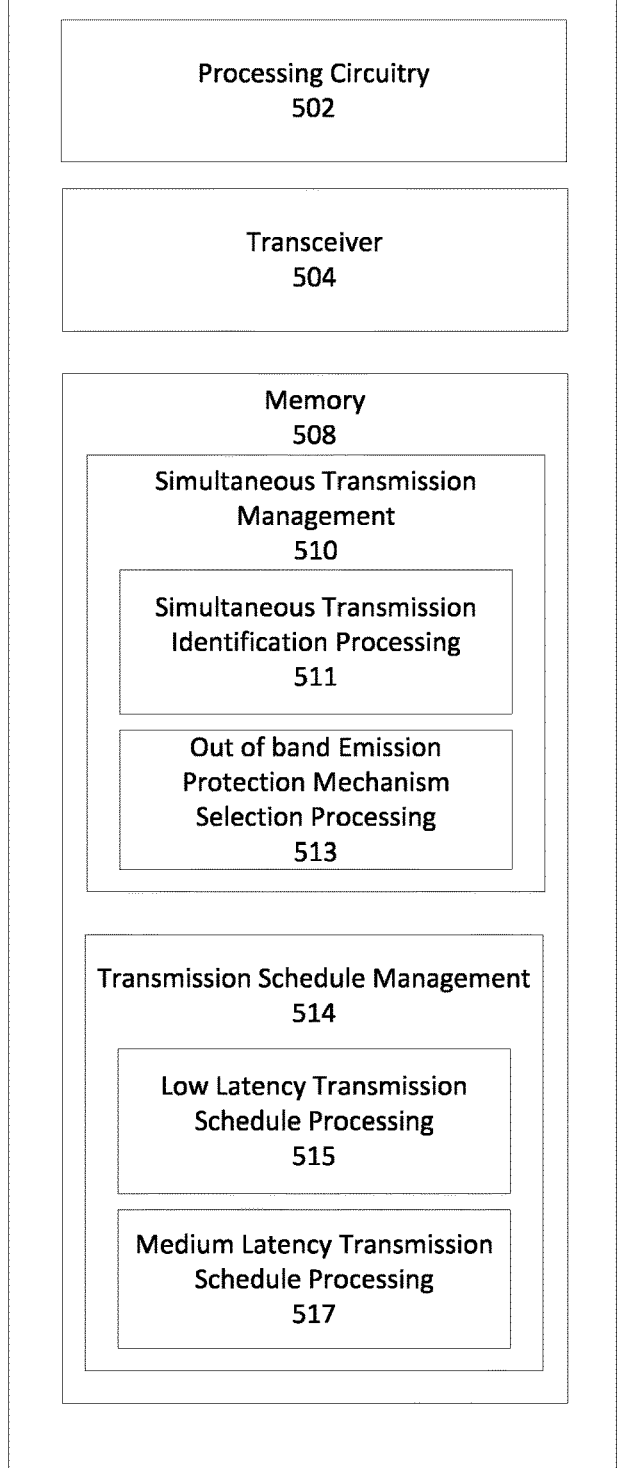
FIG. 5 illustrates an example device, in accordance with the disclosure.

Additionally or alternatively, the wireless communication devices 102.1-102.N may be implemented as other types of devices such as roadside equipment, which may include an ITS station 104.5, and may communicate with one another (such as via the radio links 124.1-124.3). The wireless communication devices 102.1-102.N may additionally be configured to communicate with other suitable types of roadside units or infrastructure, which may include the tolling unit 110 as shown in FIG. 1 (such as via the radio link 126). For purposes of brevity, the radio links as shown in FIG. 1 are not illustrated for every possible type of wireless communications between the wireless communication devices 102.1-102.N. However, it is understood that each of the wireless communication devices 102.1-102.N may communicate with one another, the base station 104, network node 106, the tolling unit 110, and/or any other suitable number and/or type of components using any suitable number and/or type of communication standards and accompanying protocols. Additional details regarding the wireless communication devices that enable such wireless communications are shown in FIG. 5.

The base station 104 may form part of the network node 106 or form separate components. The base station 104 may be implemented as any suitable type of wireless communication device configured to service any suitable number of wireless communication devices 102.1-102.N within a particular coverage zone or range. The base station 104 may be implemented as an eNodeB, a small cell, a femto cell, a pico cell, a micro cell, a road side unit, etc., or other suitable types of infrastructure devices capable of wireless communications. The base station 104 may, when implemented separately from the network node 106, communicate with the network node 106 using the link 130, which may represent one or more wired and/or wireless backhaul communication paths to support the base station 104 servicing one or more of the wireless communication devices 102.1-102.N As shown in FIG. 1, the wireless communication device 102.4 may communicate with the tolling system 110, and thus the wireless communication device 102.4 may be implemented in such as case as a mobile device configured as an On-Board Unit (OBU). The OBU in this scenario may communicate with the components of the tolling unit 110 to trigger raising a barrier and levying of tolls electronically. Communications in this regard may occur via the radio link 126, and may utilize the EU wide DSCR/tolling frequency band of 5795-5815 MHz as shown in FIG. 2. However, the proximity of the other wireless communication devices 102.1-102.3, which may communicate with one another and/or the base station 104 using the ITS frequency bands 5855-5935 MHz, may introduce out of band emissions that interfere with the tolling service communications via the radio link 126. The techniques as described further below address these issues by providing a dynamic selection process for the wireless communication devices 102.1-102.N to select one or more predetermined out of band emission protection mechanisms to meet a predetermined out of band emission threshold requirement, and thus protect the tolling service communications via the radio link 126.

Turning now to FIG. 2, this scenario is illustrated in further detail, which shows a frequency allocation for ITS channel usage in Europe and includes a frequency band of 5975 MHz-5815 MHz that is allocated by the European Telecommunications Standards Institute (ETSI) for DSRC tolling communications. Thus, and with reference to FIG. 1, the wireless communication device 102.4 may use this frequency band to transmit data to and receive data from the tolling unit 110 in accordance with the DSRC communication standard using the radio link 126. However, other communications using ITS services, which may include the base station 104, the wireless communication devices 102.1-102.3, and/or the wireless communication device 102.5 via the radio links 120, 122, 124, etc., may use the frequency band of 5855-5935 MHz at the time of this writing for ITS services. Such communications for ITS services using the 5855-5935 MHz frequency band may include the aforementioned ITS G5 communication standard and the LTE C-V2X communication standard, or other suitable communication standards.

However, despite the 50 MHz of separation between these different frequency bands, communications within the 5855-5935 MHz frequency band may introduce out of band emissions into the 5975-5815 MHz frequency band. For ITS-5G data transmissions, channel access protocol is implemented as ITS-5G is based upon the IEEE 802.11p standard, and multiple requests for channel access to the 10 MHz channels within the 5855-5935 MHz frequency band are resolved through this procedure such that only a single wireless communication device uses one 10 MHz channel in the 5855-5935 MHz frequency band at one time.

To this end, Section 3.3.6 of the Electronic Communications Committee (ECC) Report 228, found at https://docdb.cept.org/download/95cf8976-fa03/ECCREP228.PDF, introduces several options on how ITS systems may protect tolling services. However, this report was originally developed before LTE C-V2X and thus the specificities of LTE C-V2X was not considered as part of the report. Thus, in the ECC Report, it is assumed that only a single wireless communication device transmits on a 10 MHz channel in the 5855-5935 MHz frequency band.

However, for transmissions in accordance with the LTE C-V2X communication standard, several wireless communication devices may transmit simultaneously on different 10 MHz channels using the 5855-5935 MHz frequency band. This is a result of different wireless communication devices using different time and frequency resource blocks, which is defined as part of the LTE C-V2X communication standard. That is, the wireless communication device 102.5 may transmit safety service messages using one of the 10 MHz channels within the 5875-5905 MHz frequency band, while one of the vehicles 102.1-102.3 may simultaneously transmit non-safety related messages using the same 10 MHz channel in the 5855-5875 MHz frequency band. Thus, although the capability exists for multiple wireless communication devices to transmit within the 5855-5935 frequency band using the LTE C-V2X communication standard, current out of band emission reduction techniques to protect the 5975-5815 MHz frequency band limit such transmissions to one wireless communication device at a time. This dramatically reduces overall system efficiency. Thus, and as described in further detail below, the techniques described in this Section enable such LTE C-V2X to meet the requirements of ECC Report 228 although several wireless communication devices may transmit simultaneously on the same 10 MHz channel in the 5855-5935 MHz frequency band, which is particularly challenging with respect to meeting the out of band emission requirements. As used herein, simultaneously may refer to concurrent transmissions or transmissions that may be within a suitable threshold time period of one another, excepting for network latency and other factors.

Of note, the techniques described in this Section are not limited to LTE C-V2X communication standards, and may include the use of any type of communication protocol that may utilize simultaneous wireless device transmissions that result in an aggregation of out of band emissions on a different region of the frequency spectrum that needs to be protected. However, it may be particularly useful and convenient to utilize predetermined out of band emission threshold requirements, such as those defined in currently-existing standards or recommendations (such as the ECC Report 228 noted above) to protect the 5975-5815 MHz frequency band (or other suitable frequency bands depending upon the particular application and communication standards that are implemented). Moreover, the techniques described herein are not limited to a particular region, frequency spectrum, the use of the 5855-5935 frequency band, or the use of 10 MHz channels. Instead, the techniques as described herein may be implemented for any suitable frequency band and channel allocation scheme, which may include channels smaller than or larger than 10 MHz channels (such as multiples thereof), frequency spectrums and/or frequency bands of operation different than the 5855-5935 frequency band, etc. This may additionally or alternatively include communication standards, protocols, and/or frequency bands that are not currently in use at the time of this writing. As one illustrative scenario, this may include the use of the 3.8-4.2 GHz frequency band that is being proposed at the time of this writing in various jurisdictions.

Referring now back to FIG. 1, one or more (or all) of the wireless communication devices 102.1-102.N may dynamically select one or more predetermined out of band emission protection mechanisms based upon a detected number of simultaneous LTE C-V2X wireless communication device data transmissions over the 5855-5935 MHz frequency band. These predetermined out of band emission protection mechanisms may include one or more of the available methods for protecting tolling operation in the 5975-5815 MHz frequency band as defined in ECC Report 228. In other words, as the number of simultaneous LTE C-V2X wireless communication device data transmissions over the 5855-5935 MHz frequency band increases, the out of band emission protection mechanisms may be changed. This results in the highest possible efficiency of spectrum usage in the proximity of tolling stations, while minimizing the latency for communicating safety critical messages (such as emergency braking). Moreover, the network node 106 and/or one or more of the wireless communication devices 102.1-102.N may continuously monitor the environment of the wireless network 100 and, when new devices enter the coverage area or devices leave, then the selection of the out of band emission protection mechanisms may be adapted accordingly.

The ECC Report 228 in particular introduces several out of band emission protection mechanisms to protect the 5975-5815 MHz frequency band. The ECC Report 228 indicates that compatibility regarding unwanted (out of band) emissions can be assumed with an unwanted (out of band) emissions limit of −45 dBm/MHz Effective Isotropic Radiated Power (EIRP), taking into account the specifications given for ITS in ETSI (EN 302 637-2, EN 302 571) without additional mitigation methods for the tolling UL. This is done by taking into account the following:

1. The ITS duty cycle is based on the standard Cooperative Awareness Messages (CAM), a maximum of 10 messages per second with a maximum length of 1 ms leading to a duty cycle of 1% in average in one hour.
2. The Decentralized Environmental Notification Messages (DENM) with a duty cycle maximum of 2% with a maximum length of 1 ms were not included in the interference study, however DENM are only transmitted temporarily on traffic incidents such as emergency braking (leading to a peak of 3% in a second including the regular CAM messages).
3. For applications with higher duty cycles or higher unwanted emission levels than −45 dBm/MHz, additional mitigation techniques such as tolling station detection (e.g., beaconing solutions included in the CAM specification) including corresponding mitigation techniques (e.g. power and/or duty cycle reduction) are required.
4. Without interference mitigation techniques, ITS unwanted (out of band) emissions of −60 dBm/MHz EIRP (for cars) and −65 dBm/MHz EIRP (for trucks) would protect the roadside unit (RSU) in all cases in the interference zone.
5. ITS stations outside the interference zone for the unwanted emissions can operate without specific mitigation techniques with an out of band emission limit of −30 dBm/MHz.

Moreover, the 3GPP TSG RAN WG4 (RAN4) communication standard, the most recent version as of this writing being Release 17 published Dec. 12, 2020, defines a threshold out of band emission threshold requirement of −60 dBm/MHz for cars and −65 dBm/MHz for trucks in the frequency range 5795-5815 MHz, which wireless communication devices operating in accordance with the C-LTE V2X communication standards are required to meet. A copy of the appropriate Section (6.6.3.2A) of the 3GPP RAN4 requirement in this regard is reproduced below for reference.

TABLE 1

| When "NS_33" or "NS 34" is configured from pre-configured radio parameters or the cell and the indication from upper layers has indicated that the UE is within the protection zone of CEN DSRC devices or HDR DSRC devices, the power of any V2X UE emission shall fulfill either one of the two sets of conditions: | | |
| --- | --- | --- |
| | Maximum Transmission Power (dBm EIRP) | Emission Limit in Frequency Range 5975-5815 (dBm/MHz EIRP) |
| Condition 1 | 10 | −65 |
| Condition 2 | 10 | −45 |

In other words, the 3GPP LTE C-V2X standard inherently provides some protection for tolling operation in the 5975-5815 MHz frequency band by imposing an out of band emission threshold requirement, but this requirement assumes that only a single wireless communication device is using a 10 MHz channel in the 5855-5935 MHz frequency band at one time. That is, the imposed RAN4 limit is defined for a single wireless communication device, and does not relate to an aggregation of out of band emissions that may occur when multiple wireless communication devices transmit simultaneously over one or more 10 MHz channels using the 5855-5935 MHz frequency band.

Thus, this Section describes techniques in which the ECC Report 228 requirements (or other suitable requirements) may be met even during simultaneous wireless communication device transmissions over the 5855-5935 MHz frequency band. These techniques may be implemented by the wireless communication devices 102.1-102.N themselves. Additionally or alternatively, these techniques may be implemented in conjunction with the base station 104 and/or network node 106 providing network control. Each of these techniques is discussed in turn below.

Fully Distributed Decision Making without Network Control

Figure 3:
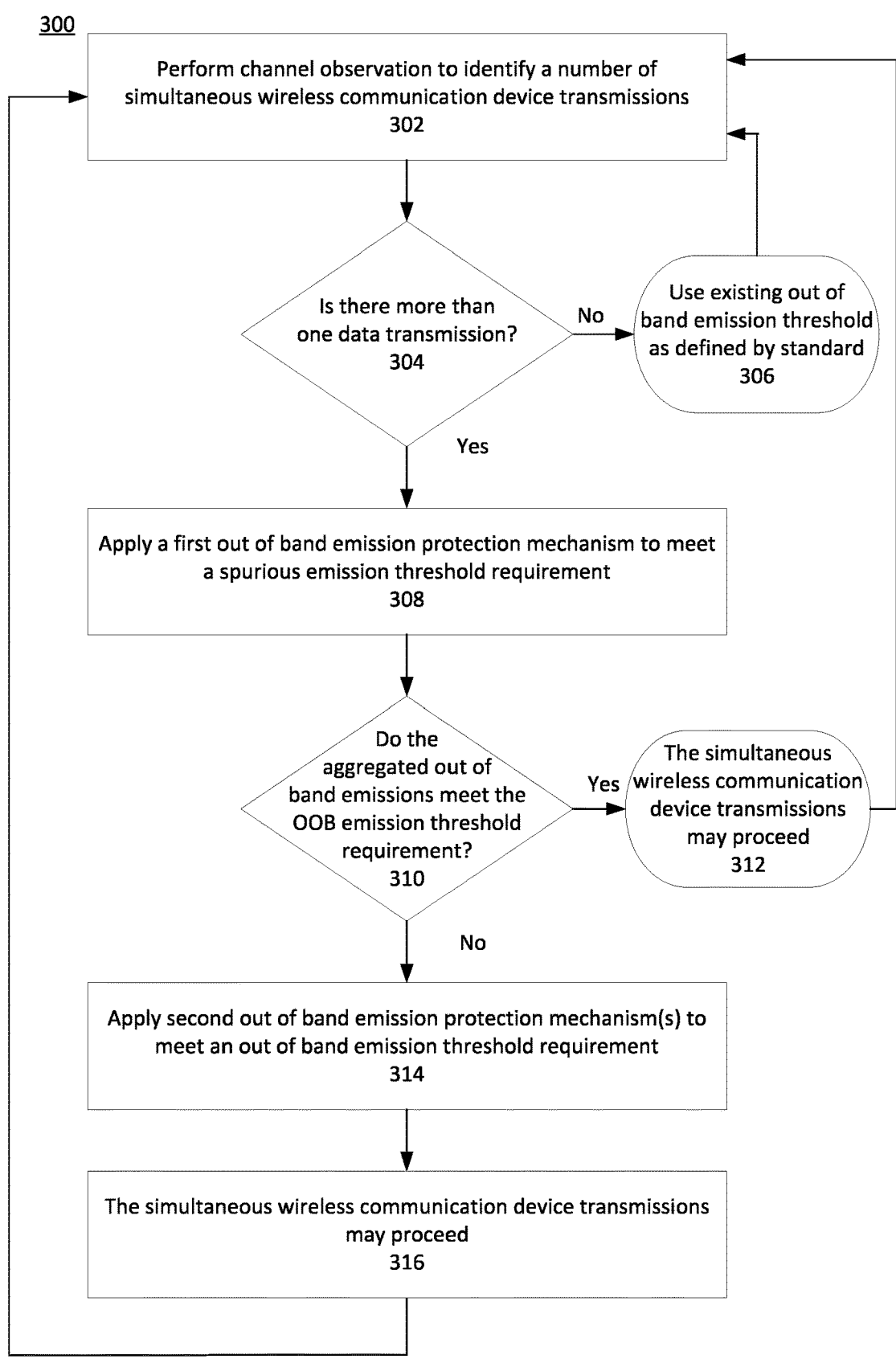
FIG. 3 illustrates a process flow for the dynamic selection of out of band emission protection mechanisms without network control, in accordance with the disclosure.

Turning now to FIG. 3, a process flow 300 is shown with respect to the dynamic selection of one or more predetermined out of band emission protection mechanisms based upon a detected number of simultaneous device data transmissions in a 10 MHz channel of a first frequency band, which may include a 10 MHz channel in the 5855-5935 MHz frequency band as noted herein. The process flow 300 may include additional, alternate, or fewer processing operations than those shown in FIG. 3. The process flow 300 may be performed by the appropriate processors, processing circuitry, etc. of the wireless communication devices 102.1-102.N as shown and discussed herein with reference to FIG. 1.

The process flow 300 may be initiated by one or more (or all) of the wireless communication devices 102.1-102.N by performing (block 302) a channel observation measurement over the 5855-5935 MHz frequency band. This may be performed in accordance with the 3GPP standard for LTE C-V2X, which requires LTE channel observations to be performed and may include decoding signaling fields from other wireless communication device transmissions, which indicate the resource blocks needed for respective transmissions within a certain time interval. Such channel observations may be with respect to the 10 MHz spectral channels as shown in FIG. 2. Thus, the channel observation may occur prior to or during a data transmission on any channel of the 5855-5935 MHz frequency band to determine a number of other wireless communication devices that are simultaneously using that channel in the 5855-5935 MHz frequency band. Alternatively, the channel observation may be performed in accordance with any suitable technique, which may be performed in accordance with the particular channel structure and communication protocol that is implemented.

The process flow 300 further includes one or more of the wireless communication devices 102.1-102.N determining (block 304), from the results of the channel observation, whether more than one wireless communication device 102 is using the same 10 MHz channel within the 5855-5935 MHz frequency band. If only a single wireless communication device 102 is accessing the 5855-5935 MHz frequency band, then no further protection is required as this scenario already inherently provides protection for tolling operation. That is, the data transmission may continue using (block 306) the existing out of band emission threshold as defined by an appropriate communication standard. This may include the 3GPP RAN4 standard as noted above which defines a predetermined out of band emission threshold in the 5975-5815 MHz frequency band in accordance with the −60 dBm/MHz (for cars, −65 dBm/MHz for trucks) for single use cases. In other words, the data transmission may proceed without further modifications to the transmission output power level or transmission parameters, as the wireless communication device 102 is ensured to comply with the out of band emission requirement by nature of certification for use in accordance with the LTE C-V2X standard. In this case, the use of the existing out of band emission threshold in accordance with the standard constitutes an out of band emission protection mechanism, but is separate from the additional (first and second) out of band emission protection mechanisms further discussed below.

It is further noted that the determination (block 304) of the number of simultaneous data transmissions over a channel in the 5855-5935 MHz frequency band may be performed by a respective wireless communication device 102.1-102.N that is performing the process flow 300. Alternatively, the determination of the number of simultaneous device transmissions using the same channel may be determined by the network node 106 and/or a separate wireless device 102 that is also serviced by the wireless communication device 102 that is performing the process flow 300. In such a case, the determined number (or an indication that this number is greater than a single transmission) of simultaneous device data transmissions over the same channel may be transmitted to the wireless communication device 102 that is performing the process flow 300. Such communications may occur via upon request (pull) or without request (push) by the wireless communication device 102 that is performing the process flow 300. Thus, not all wireless communication device 102.1-102.N are required to detect the number of devices simultaneously transmitting over the same channel, although such observations may be shared among other wireless communication devices 102.1-102.N via communications from wireless communication devices 102.1-102.N that are performing the detection.

However, in the event that the channel observation detects the presence of two or more simultaneous device data transmissions using the same channel in the 5855-5935 MHz frequency band, the process flow 300 includes selecting and applying (block 308) a first predetermined out of band emission protection mechanism to perform the data transmission. This applied predetermined out of band emission protection mechanism may include any suitable number and/or type of transmission parameters that function to adjust the manner in which data is transmitted over the channel to meet a predetermined out of band emission protection threshold requirement. Again, this predetermined out of band emission protection threshold requirement may include any suitable predetermined threshold, such as the −60 dBm/MHz (for cars, −65 dBm/MHz for trucks) out of band emission protection threshold requirement as defined by the 3GPP RAN4 standard.

To do so, each predetermined out of band emission protection mechanism may be identified with any suitable number and/or type of transmission parameters that, when applied by a wireless communication device 102.1-102.N, function to adjust specific aspects of a data transmission. Thus, and as further noted herein, each predetermined out of band emission protection mechanism respectively defines one or more transmission parameters that results in an aggregation of out of band emissions caused by the simultaneous device data transmissions over using the same channel in the 5855-5935 MHz frequency band, which are introduced into the 5975-5815 MHz frequency band, to meet a predetermined out of band emission threshold requirement. In this scenario, the transmission parameters may include transmission power output settings such as power amplifier (PA) gain settings, bias settings, etc. that, when applied by the processing circuitry of a particular wireless communication device 102.1-102.N, results in a reduced transmission power output level for that wireless communication device. The reduced transmission power output level may be determined in any suitable manner, such as an EIRP level known a priori to be correlated to the transmission power output settings.

The transmission parameters may be utilized by the wireless communication device 102.1-102.N that is performing the channel observation to meet the predetermined out of band emission protection threshold requirement. Additionally or alternatively, the transmission parameters may be utilized by one or more (or all) of the wireless communication devices 102.1-102.N that are performing the simultaneous data transmission using the same channel in the 5855-5935 MHz frequency band. This may be accomplished via the use of any suitable techniques to indicate, to the other simultaneously transmitting devices, that a particular predetermined out of band emission protection mechanism needs to be applied. Thus, each wireless communication device 102.1-102.N may locally store and access the specific transmission parameters needed to apply the identified predetermined out of band emission protection mechanism. The transmission parameters may be utilized by any suitable number of the wireless communication devices 102.1-102.N and may vary on a per device basis. In the current scenario, the first applied (block 308) predetermined out of band emission protection mechanism results in the application of transmission parameters to provide a reduced transmission output power level for one or more (or all) of the wireless communication devices 102.1-102.N performing the simultaneous device data transmissions.

Although the transmission parameters may be the same for each wireless communication device 102.1-102.N, it may be advantageous to define a specific per-device set of transmission parameters. These transmission parameters may be the result of calibrated testing that correlates the transmission output power or other transmission parameters to a known impact on out of band emissions in a specific frequency band (such as the 5795-5815 MHz frequency band). Thus, the transmission parameters may be based upon the manufacturer, type of device, specific components, etc. In particular, it is noted that the 3GPP LTE C-V2X standard imposes a Power Spectral Density (PSD) threshold requirement for simultaneous data transmissions over channels in the 5855-5935 MHz frequency band. This PSD threshold requirement represents an aggregate PSD over all wireless communication devices 102.1-102.N simultaneously transmitting in accordance with the LTE C-V2X standard, which is limited to a level given by EN 302 571 (i.e., the level applied by DSRC/ITS-G5). The LTE C-V2X PSD requirement thus requires two or more or more wireless communication devices that are transmitting simultaneously over the same channel in the 5855-5935 MHz frequency band to respectively perform an output power reduction to be meet the PSD requirements.

However, the transmission power output reduction provided in accordance with the LTE C-V2X standard may not linearly track with the reduction in out of band emissions in the 5795-5815 MHz frequency band. That is, the LTE C-V2X standard may indicate, for each of a number N of wireless communication devices that are transmitting simultaneously over a channel in the 5855-5935 MHz frequency band, a respective reduction in transmission output power by a level of 1/N (e.g. 50% for two transmitting devices). However, due to PA nonlinearities, mixer artifacts, etc., such a transmission output reduction may satisfy the PSD requirement but still violate the predetermined out of band emission protection threshold requirement (such as the −60 dBm/MHz for cars, −65 dBm/MHz for trucks).

To remedy this issue, the techniques described in this Section include the use of a custom and per-device tailored set of transmission parameters, which may be applied (block 308) as part of the first predetermined out of band emission protection mechanism. Again, these per-device transmission parameters may be the result of calibrated testing correlating the transmission output power or other transmission parameters to a known impact on out of band emissions in the 5795-5815 MHz frequency band. In this way, the applied per-device tailored set of transmission parameters results in a reduction in transmission output power of one or more of the simultaneously transmitting wireless devices to meet the PSD threshold requirement, but are also more likely to satisfy the predetermined out of band emission protection threshold requirement. Alternatively, and because additional predetermined out of band emission protection mechanisms may still be applied as further discussed below, the applied (308) first predetermined out of band emission protection mechanism may include transmission parameters that result in a reduction of transmission power levels as defined by the LTE C-V2X standard to meet the PSD requirements (i.e. the 1/N transmission output power reduction).

In any event, after the first predetermined out of band emission protection mechanism has been applied (block 308), the process flow 300 includes the processing circuitry of a relevant wireless communication device 102.1-102.N determining (block 310) whether the new aggregated out of band emission levels in the 5795 MHz-5815 MHz tolling frequency band satisfy the predetermined out of band emission protection threshold requirement (such as −60 dBm/MHz for cars, −65 dBm/MHz for trucks). If so, then the simultaneous wireless communication device data transmissions over the channels in the 5855-5935 MHz frequency band may proceed/continue (block 312) without any further protection of the 5795 MHz-5815 MHz tolling frequency band. This determination may be performed in accordance with any suitable techniques, such as using a receiver of one or more of the wireless communication devices 102.1-102.N listening (sniffing) the 5795 MHz-5815 MHz tolling frequency band to identify whether the aggregate out of band emissions are within the predetermined out of band emission protection threshold requirement.

However, in the event that the new aggregated out of band emission levels in the 5795 MHz-5815 MHz tolling frequency band fail to satisfy the predetermined out of band emission protection threshold requirement, the process flow 300 may include the processing circuitry of a relevant wireless communication device 102.1-102.N selecting and applying (block 314) second predetermined out of band emission protection mechanism. These second predetermined out of band emission protection mechanism may also include any suitable number of transmission parameters that function to further reduce the out of band emissions in the 5795 MHz-5815 MHz tolling frequency band in various ways.

In one scenario, the transmission parameters for the second predetermined out of band emission protection mechanism may include a further reduction of transmission output power levels by the relevant wireless communication device(s) 102.1-102.N that are simultaneously transmitting over the same channel in the 5855-5935 MHz frequency band. Thus, the second predetermined out of band emission protection mechanism may include defined transmission parameters that result in various transmitter settings that further reduce the transmitter output power level by a respective wireless communication device 102.1-102.N. This may include predetermined transmitter settings based up on a priori knowledge derived from testing, as noted above, but may result in an addition level of transmitter output power reduction that is more likely to satisfy both the PSD threshold requirement and the predetermined out of band emission protection threshold requirement.

Additionally or alternatively, the second predetermined out of band emission protection mechanism(s) may define one or more transmission parameters that are correlated to one or more of the rules as defined by the ECC Report 228. This may include any suitable number and/or type of transmission-based rule that is allowed under the ECC Report 228 guidelines. Of course, any other suitable type of transmission parameters may be implemented to ensure that the predetermined out of band emission protection threshold requirement is met. In one scenario, the ECC report indicates that applications with higher duty cycles or higher unwanted emission levels than −45 dBm/MHz may use additional mitigation techniques like tolling station detection (the beaconing solution included in the CAM specification) including corresponding mitigation techniques (e.g. power and/or duty cycle reduction), etc.

Thus, although the second predetermined out of band emission protection mechanism may include any suitable combination of the ECC Report 228 mitigation techniques, it may be particularly useful to implement the power and duty cycle mitigation techniques as these may be performed quickly and independently via each wireless communication device 102.1-102.N as needed. Thus, the one or more transmission parameters that define the further reduction in transmitter output power may be defined as noted above (i.e. on a per device or custom manner) or via defined power reduction techniques as defined in the ECC Report 228. Additionally or alternatively, the one or more transmission parameters defined by the second predetermined out of band emission protection mechanism may cause a reduction in the frequency of messages repetitively transmitted via a relevant wireless communication device 102.1-102.N using a channel within the 5855-5935 MHz frequency band. In other words, the reduction in the frequency of messages may be in accordance with the reduction in duty cycle while transmitting at a higher transmission output power level, as allowed by the ECC Report 228. The second predetermined out of band emission protection mechanism is not limited to the aforementioned power reduction and duty cycle reduction, and any suitable number and/or type of techniques to mitigate out of band emissions in the 5795 MHz-5815 MHz tolling frequency band. Moreover, these techniques may be applied separately or in combination with one another, such that only the frequency of messages may be decreased or only the transmission output power may be decreased.

Upon applying (block 314) the second predetermined out of band emission protection mechanism, the data transmissions may continue (block 316) in accordance with the applied transmission parameters. After each data transmission, regardless of the particular predetermined out of band emission protection mechanism that is used, the process flow 300 may be repeated for subsequent data transmissions, and the channel observation (block 302) may be performed prior to and/or during a data transmission. That is, and as shown in FIG. 3, the process flow 300 and portions thereof may be repeated in accordance with any suitable type of interval (such as a LTE C-V2X transmission time interval (TTI)). Thus, a wireless communication device 102.1-102.N may adopt a selected predetermined out of band emission protection mechanism to perform the next data transmission or, alternatively, apply the predetermined out of band emission protection prior to performing a data transmission if it is known from available data known a priori that the data transmission will violate the predetermined out of band emission threshold.

Although two stages or types of predetermined out of band emission protection mechanisms are shown and described in FIG. 3, the process flow 300 may utilize any suitable number of such predetermined out of band emission protection mechanisms. These may include any combination of the aforementioned out of band emission protection mechanisms as well as fewer, additional, or alternate out of band emission protection mechanisms.

Distributed Decision Making Using Network Control

The process flow 300 may be performed locally via each of the wireless communication devices 102.1-102.N, which may communicate with one another and coordinate the application of the various predetermined out of band emission protection mechanisms as noted above. However, it may also be beneficial to leverage the use of network control to use the aforementioned predetermined out of band emission protection mechanisms. Thus, the process flow 400 illustrates a dynamic selection of out of band emission protection mechanisms with network control. The process flow 400 leverages network control to ensure that simultaneous transmissions over the channels in the 5855-5935 MHz frequency band do not cause excessive out of band emissions in the 5795 MHz-5815 MHz tolling frequency band. The process flow 400 shares similar or identical processes as described above with reference to FIG. 3, and therefore only differences between the process flows 300, 400 will be described further herein for purposes of brevity.

The process flow 400 begins with the identification (block 402) of a number of simultaneous wireless communication device transmissions using the 5855-5935 MHz frequency band. However, in contrast to the process flow 300 in which each wireless communication device 102.1-102.N may independently make this determination by performing channel observation and decoding signaling fields, the process flow 400 exploits the use of a network-generated transmission schedule. In other words, the network node 106 may determine a transmission schedule for the wireless communication devices 102.1-102.N, which assigns transmission channels to specific wireless communication devices 102.1-102.N at specific times. From this information, the network node 106 may determine (block 404) whether upcoming transmission time slots are assigned to more than two simultaneous transmission wireless communication device transmissions using the 5855-5935 MHz frequency band. Again, if not, no changes are needed and the data transmission may continue using (block 406) using the existing out of band emission threshold as defined by an appropriate communication standard.

However, in the event that the transmission schedule indicates that an upcoming scheduled transmission time slot is assigned to two or more simultaneous device data transmissions using the same channel in the 5855-5935 MHz frequency band, the process flow 400 includes the generation and transmission (block 407) of an appropriate trigger signal to these wireless communication devices. This trigger signal may be transmitted by the base station 104 or other suitable device capable of transmitting data to the wireless communication devices 102.1-102.N that are to be simultaneously transmitting using the same channel in the 5855-5935 MHz frequency band. Depending upon the particular implementation, such a trigger signal may comprise one or more control signals and/or data signals, which may encode instructions or other information with respect to the transmission parameters to be applied (block 408) by each wireless communication device 102.1-102.N in accordance with the first predetermined out of band emissions protection mechanism.

The first predetermined out of band emission protection mechanism that is applied (block 408) by each of the wireless communication devices 102.1-102.N that will be simultaneously transmitting on the same channel may include those as discussed herein with reference to the process flow 300 at block 308. The transmission parameters to be used in accordance the first predetermined out of band emission protection mechanism may be transmitted to the wireless devices 102.1-102.N that are to be simultaneously transmitting as part of the trigger signal transmission. Alternatively the transmission parameters to be used in accordance the first predetermined out of band emission protection mechanism may be stored locally on each wireless communication device 102.1-102.N, as was the case as described above for the process flow 300. That is, the network node 106 may have access to the transmission parameters via network communications and/or communications with other appropriate data entities, which may be used to derive the transmission parameters on a per wireless communication device basis. Thus, the trigger signal may instruct the simultaneously transmitting wireless communication devices 102.1-102.N to use the first predetermined out of band emission protection mechanism by applying transmission parameters as transmitted via the trigger signal and/or using their locally-stored transmission parameters.

In any event, after the first predetermined out of band emission protection mechanism has been applied (block 408), the process flow 400 includes a determination (block 410) of whether the new aggregated out of band emission levels in the 5795 MHz-5815 MHz tolling frequency band satisfy the predetermined out of band emission protection threshold requirement (such as −60 dBm/MHz for cars, −65 dBm/MHz for trucks). This determination may be performed locally via each of the wireless communication devices 102.1-102.N simultaneously transmitting on the same channel during a particular scheduled transmission time slot. In such a case, this determination (block 410) may be performed as discussed herein with reference to the process flow 300 at block 410. Alternatively, one or more network components (such as the base station 104) may perform this determination by listening (sniffing) on the 5795 MHz-5815 MHz tolling frequency band. In any event, if the new aggregated out of band emission levels in the 5795 MHz-5815 MHz tolling frequency band satisfy the predetermined out of band emission protection threshold requirement, then the simultaneous wireless communication device data transmissions over the channels in the 5855-5935 MHz frequency band may proceed/continue (block 412) without any further protection of the 5795 MHz-5815 MHz tolling frequency band.

However, in the event that the new aggregated out of band emission levels in the 5795 MHz-5815 MHz tolling frequency band fail to satisfy the predetermined out of band emission protection threshold requirement, the process flow 400 may include the base station 104 transmitting (block 413) an additional trigger signal. This additional trigger signal may be transmitted by the base station 104 or other suitable device capable of transmitting data to the wireless communication devices 102.1-102.N that are simultaneously transmitting using the same channel in the 5855-5935 MHz frequency band. Again, depending upon the particular implementation, such a trigger signal may comprise control signals and/or data signals with respect to the transmission parameters to be applied (block 414) by each wireless communication device 102.1-102.N in accordance with a second predetermined out of band emissions protection mechanism. Thus, the transmitted (block 413) trigger signal may instruct the simultaneously transmitting wireless communication devices 102.1-102.N to use the second predetermined out of band emission protection mechanism by applying transmission parameters as indicated via the trigger signal and/or using their locally-stored transmission parameters.

Upon applying (block 414) the second predetermined out of band emission protection mechanism, the data transmissions may continue (block 416) in accordance with the applied transmission parameters. As noted for the process flow 300 above, after each data transmission, regardless of the particular predetermined out of band emission protection mechanism that is used, the process flow 400 may be repeated for subsequent data transmissions.

Figure 4:
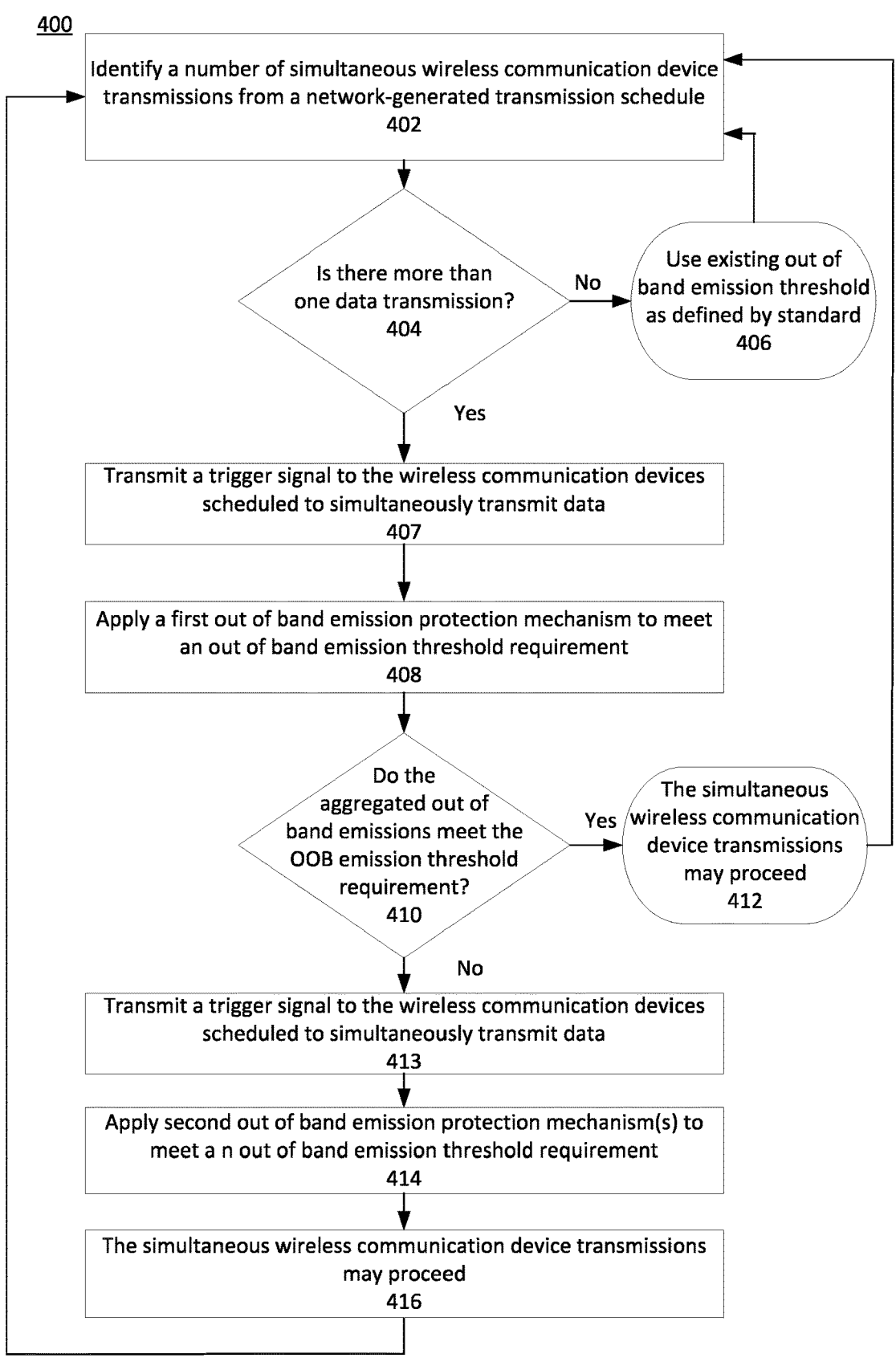
FIG. 4 illustrates a process flow for the dynamic selection of out of band emission protection mechanisms with network control, in accordance with the disclosure.

The process flow 400 may include additional, alternate, or fewer processing operations than those shown in FIG. 4. As noted above, the various operations described with reference to the process flow 400 may be performed by any suitable combination of local wireless communication devices 102.1-102.N and the network components (such as the base station 104 and the network node 106). In one scenario, although the process flow 400 is illustrated using two separate trigger signal transmissions (blocks 407, 413), the second of these trigger signal transmissions is optional. That is, the first trigger signal transmission (block 407) may simply function to instruct the wireless communication devices 102.1-102.N regarding the timing of scheduled upcoming simultaneous transmissions. In such a case, each wireless communication device 102.1-102.N receiving the trigger signal may independently implement the various processing operations and use the appropriate predetermined out of band emission protection mechanism without further network assistance and/or without receiving additional trigger signals.

Wireless Communication Device Architecture

FIG. 5 illustrates an example device, in accordance with the disclosure. The device 500 may be identified with one or more devices operating with a wireless network in accordance with any suitable number and/or type of communication protocols. For example, the device 500 may be identified with one of the wireless communication devices 102.1-102.N, which may include an ITS-S, a UE, the base station 104, etc., as discussed herein with reference to FIG. 1. As further discussed below, the device 500 may perform the techniques as discussed herein with respect to the process flows 300, 400 as shown in FIGS. 3 and 4, respectively. Thus, the device 500 may perform the various functionality as described herein with respect to selectively and dynamically using one or more predetermined out of band emission protection mechanisms based upon a detected number of simultaneous LTE C-V2X wireless communication device data transmissions over the 5855-5935 MHz frequency band. To do so, the device 500 may include processing circuitry 502, a transceiver 504, and a memory 508. The components shown in FIG. 5 are provided for ease of explanation, and the device 500 may implement additional, less, or alternative components as those shown in FIG. 5.

The processing circuitry 502 may be configured as any suitable number and/or type of computer processors, which may function to control the device 500 and/or other components of the device 500. The processing circuitry 502 may be identified with one or more processors (or suitable portions thereof) implemented by the device 500. The processing circuitry 502 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc. Although referred to as processing circuitry herein, it is understood that the processing circuitry 502 may work in conjunction with software components to execute machine readable-instructions stored in the memory 508, to execute sets of instructions or code, etc. to realize the various techniques as described herein.

In any event, the processing circuitry 502 is configured to carry out instructions to perform arithmetical, logical, and/or input/output (I/O) operations, and/or to control the operation of one or more components of device 500 to perform various functions associated with the techniques as described herein. The processing circuitry 502 may include one or more microprocessor cores, memory registers, buffers, clocks, etc., and may generate electronic control signals associated with the components of the device 500 to control and/or modify the operation of these components. The processing circuitry 502 may communicate with and/or control functions associated with the transceiver 504 and/or the memory 508.

The transceiver 504 may be implemented as any suitable number and/or type of components configured to transmit and/or receive wireless signals and/or data in accordance with any suitable number and/or type of communication protocols, as discussed herein. The transceiver 504 may include any suitable type of components to facilitate this functionality, including components associated with known transceiver, transmitter, and/or receiver operation, configurations, and implementations. Although depicted in FIG. 5 as a transceiver, the transceiver 504 may include any suitable number of transmitters, receivers, or combinations of these that may be integrated into a single transceiver or as multiple transceivers or transceiver modules. The transceiver 504 may include components typically identified with transmitter and receiver architectures, and thus include antennas, ports, power amplifiers (PAs), RF filters, mixers, local oscillators (LOs), low noise amplifiers (LNAs), upconverters, downconverters, channel tuners, analog-to-digital converters (ADCs), digital to analog converters, intermediate frequency (IF) amplifiers and/or filters, modulators, demodulators, baseband processors, etc.

Regardless of the particular implementation, the transceiver 504 may include one or more components configured to transmit and receive data using any suitable number frequency bands (such as the 5855-5935 MHz frequency band) in accordance with any suitable number of communication standards and protocols (such as the LTE C-V2X standard). The transceiver 504 may be configured to receive data and/or listen on certain frequency bands as discussed herein (such as the 5855-5935 MHz frequency band, the 5975-5815 MHz frequency band, etc.) to perform channel observations, to receive trigger signals, etc. Additionally, the transceiver 504 may include one or more components configured to adjust a transmission output power using applied transmission parameters based upon a particular predetermined out of band emission protection mechanism, as discussed herein. The transceiver 504 may be controlled by the processing circuitry 502 to set the specific transmission parameters used for data transmissions in accordance with the particular predetermined out of band emission protection mechanism as discussed above.

The memory 508 stores data and/or instructions such that, when the instructions are executed by the processing circuitry 502, cause the device 500 to perform various functions as described herein, such as those described herein with reference to the process flows 300, 400. The memory 508 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 508 may be non-removable, removable, or a combination of both. The memory 508 may be implemented as a non-transitory computer readable medium storing one or more executable instructions such as logic, algorithms, code, etc.

As further discussed below, the instructions, logic, code, etc., stored in the memory 508 are represented by the various modules as shown in FIG. 5, which may enable the various processing operations as disclosed herein to be functionally realized. Alternatively, if the processing operations described herein are implemented via hardware, the modules shown in FIG. 5 and associated with the memory 508 may include instructions and/or code to facilitate control and/or monitor the operation of such hardware components. In other words, the modules shown in FIG. 5 are provided for ease of explanation regarding the functional association between hardware and software components. Thus, the processing circuitry 502 may execute the instructions stored in these respective modules in conjunction with one or more hardware components to perform the various functions associated with the various techniques as discussed herein.

The memory 508 may store any suitable number of transmission parameters used in accordance with each of the predetermined out of band emission protection mechanism as discussed above, which may be used to adjust the transmission power levels, frequency of repetitively transmitted data, etc. The simultaneous transmission management engine 510 may represent a functional realization of the techniques as described herein, such as the process flows 300, 400. This may include the selection and application of the appropriate transmission parameters in accordance with a dynamically selected out of band emissions protection mechanism based upon the number of simultaneous channel transmissions over the same channel within the 5855-5935 MHz frequency band (which may be only one or more than one). To do so, the simultaneous transmission management engine 510 comprises a simultaneous transmission identification processing module 511 and an out of band emission protection selection processing module 513.

The executable instructions stored in the simultaneous transmission identification processing module 511 may facilitate, in conjunction with execution via the processing circuitry 502, the device 500 identifying a number (which may include one) of simultaneous data transmissions over the same channel within the 5855-5935 MHz frequency band. This may include the aforementioned use of channel observation by the device 500 or, alternatively, receiving and decoding such information from the network and/or other wireless devices serviced by the same wireless network as the device 500 via pull or push communications.

The executable instructions stored in the out of band emission protection selection processing module 513 may facilitate, in conjunction with execution via the processing circuitry 502, the selection and application of a particular out of band emission protection mechanism as discussed herein with respect to the process flow 30, 400. This may include applying the appropriate adjustments to the transceiver 504 in accordance with the transmission parameters for the first out of band emission protection mechanism and determining whether the application of the first out of band emission protection mechanism allows the aggregated out of band emission to meet the threshold requirement for a particular communication standard. Additionally, this may include applying the appropriate adjustments to the transceiver 504 in accordance with the transmission parameters for the second out of band emission protection mechanism.

General Operation of a Wireless Communication Device

A device is provided. With reference to FIG. 5, the device includes a transmitter configured to transmit data using a first frequency band in accordance with a first communication protocol; and processing circuitry configured to select at least one predetermined out of band emission protection mechanisms based upon a detected number of device data transmissions over the first frequency band. The at least one predetermined out of band emission protection mechanisms respectively define one or more transmission parameters causing an aggregation of out of band emissions caused by the device data transmissions over the first frequency band, which are introduced into a second frequency band associated with a second communication protocol, to meet a predetermined out of band emission threshold requirement, and the processing circuitry is further configured to cause the transmitter to use the selected one of the set of predetermined out of band emission protection mechanisms to transmit data over the first frequency band. The processing circuitry is also configured to select, when the detected number of device data transmissions using the first frequency band is two or greater, a first one of the at least one predetermined out of band emission protection mechanisms that define one or more transmission parameters associated with a reduced transmission output power level for the transmitter. In addition or in alternative to and in any combination with the optional features previously explained in this paragraph, the use of the first predetermined out of band emission protection mechanism results in the transmitter reducing a transmission output power level. In addition or in alternative to and in any combination with the optional features previously explained in this paragraph, the device is part of a wireless network that services the device and a further device, and wherein the number of device data transmissions over the first frequency band is detected via the further device and transmitted to the device. In addition or in alternative to and in any combination with the optional features previously explained in this paragraph, the device is serviced by a wireless network, and the number of device data transmissions over the first frequency band is detected via a network node of the wireless network and transmitted to the device. In addition or in alternative to and in any combination with the optional features previously explained in this paragraph, the processing circuitry is further configured to determine the reduced transmission output power level based upon a power spectral density (PSD) threshold requirement defined by the first communication protocol in accordance with data transmissions over the first frequency band. In addition or in alternative to and in any combination with the optional features previously explained in this paragraph, the processing circuitry is configured to select a second one of the at least one predetermined out of band emission protection mechanisms when the use of the first predetermined out of band emission protection mechanism by the transmitter results in the aggregation of out of band emissions caused by the device data transmissions over the first frequency band to exceed the predetermined out of band emission threshold requirement. In addition or in alternative to and in any combination with the optional features previously explained in this paragraph, the second predetermined out of band emission protection mechanism defines one or more transmission parameters associated with a further reduced transmission output power level for the transmitter. In addition or in alternative to and in any combination with the optional features previously explained in this paragraph, the second predetermined out of band emission protection mechanism defines one or more transmission parameters associated with a reduction in a frequency of data repetitively transmitted via the transmitter using the first frequency band.

A device is provided. With reference to FIG. 5, the device includes a transceiver configured to transmit data using a first frequency band in accordance with a first communication protocol; and processing circuitry configured to: select at least one predetermined out of band emission protection mechanisms based upon an identified number of device data transmissions using the first frequency band in accordance with a first communication protocol, the number of device data transmissions being determined in accordance with a transmission schedule. The at least one predetermined out of band emission protection mechanisms define one or more one or more transmission parameters that cause an aggregation of out of band emissions caused by the device data transmissions over the first frequency band, which are introduced into a second frequency band associated with a second communication protocol, to meet a predetermined out of band emission threshold requirement. The transceiver is configured to receive a control signal that causes the transceiver to use the selected at least one of the set of predetermined out of band emission protection mechanisms to transmit data over the first frequency band. The processing circuitry is also configured to select, when the identified number of device data transmissions using the first frequency band is two or greater, a first one of the at least one predetermined out of band emission protection mechanisms that define one or more transmission parameters associated with a reduced transmission output power level for the transceiver. In addition or in alternative to and in any combination with the optional features previously explained in this paragraph, the selection of the first predetermined out of band emission protection mechanism results in the transceiver reducing a transmission output power level for transmitting data using the first frequency band. In addition or in alternative to and in any combination with the optional features previously explained in this paragraph, the reduced transmission output power level is based upon a power spectral density (PSD) threshold requirement defined by the first communication protocol in accordance with data transmissions over the first frequency band. In addition or in alternative to and in any combination with the optional features previously explained in this paragraph, the processing circuitry is configured to select a second one of the at least one predetermined out of band emission protection mechanisms when the use of the first predetermined out of band emission protection mechanism by the transceiver results in the aggregation of out of band emissions caused by the device data transmissions over the first frequency band to exceed the predetermined out of band emission threshold requirement. In addition or in alternative to and in any combination with the optional features previously explained in this paragraph, the second predetermined out of band emission protection mechanism defines one or more transmission parameters associated with a further reduced transmission output power level for the transceiver. In addition or in alternative to and in any combination with the optional features previously explained in this paragraph, the second predetermined out of band emission protection mechanism defines one or more transmission parameters associated with a reduction in a frequency of data repetitively transmitted via the transceiver using the first frequency band.

Section II—Dynamic Selection of Out of Band Emission Protection Mechanisms

Referring now back to FIG. 2, for ITS systems in Europe 30 MHz of spectrum is reserved between 5875 MHz and 5905 MHz in accordance with the ITS-G5A standard at the time of this writing. The 5875 MHz to 5905 MHz frequency band may be alternatively be referred to herein as the 5.9 GHz ITS safety band, or simply as the ITS safety band or Safety spectrum, as this portion of the spectrum as shown in FIG. 2 is used for ITS safety-related applications. This Section provides various scenarios for implementation with respect to the ITS safety band, although this is by way of example and not limitation. As noted above for Section I, the various techniques discussed throughout the entirety of the disclosure, which includes both Sections I and II, is not limited to a specific frequency band and/or communication standard. Instead, the various techniques discussed herein may be implemented in accordance with any suitable frequency band, and may be particularly advantageous for frequency bands that may be shared by one or more competing communication standards.

Moreover, this Section described various transmission scheduling techniques with respect to a scenario using the ITS safety band and 10 MHz channels, and thus references the multiple 10 MHz channels with respect to their future allocation to a single ITS system (such as DSRC/ITS-G5 and/or LTE C-V2X). Again, this is a non-limiting scenario and the techniques as described herein may be applied to any suitable type of communication standard, frequency bands, channel bandwidth, etc.

Figures 6A, 6B:
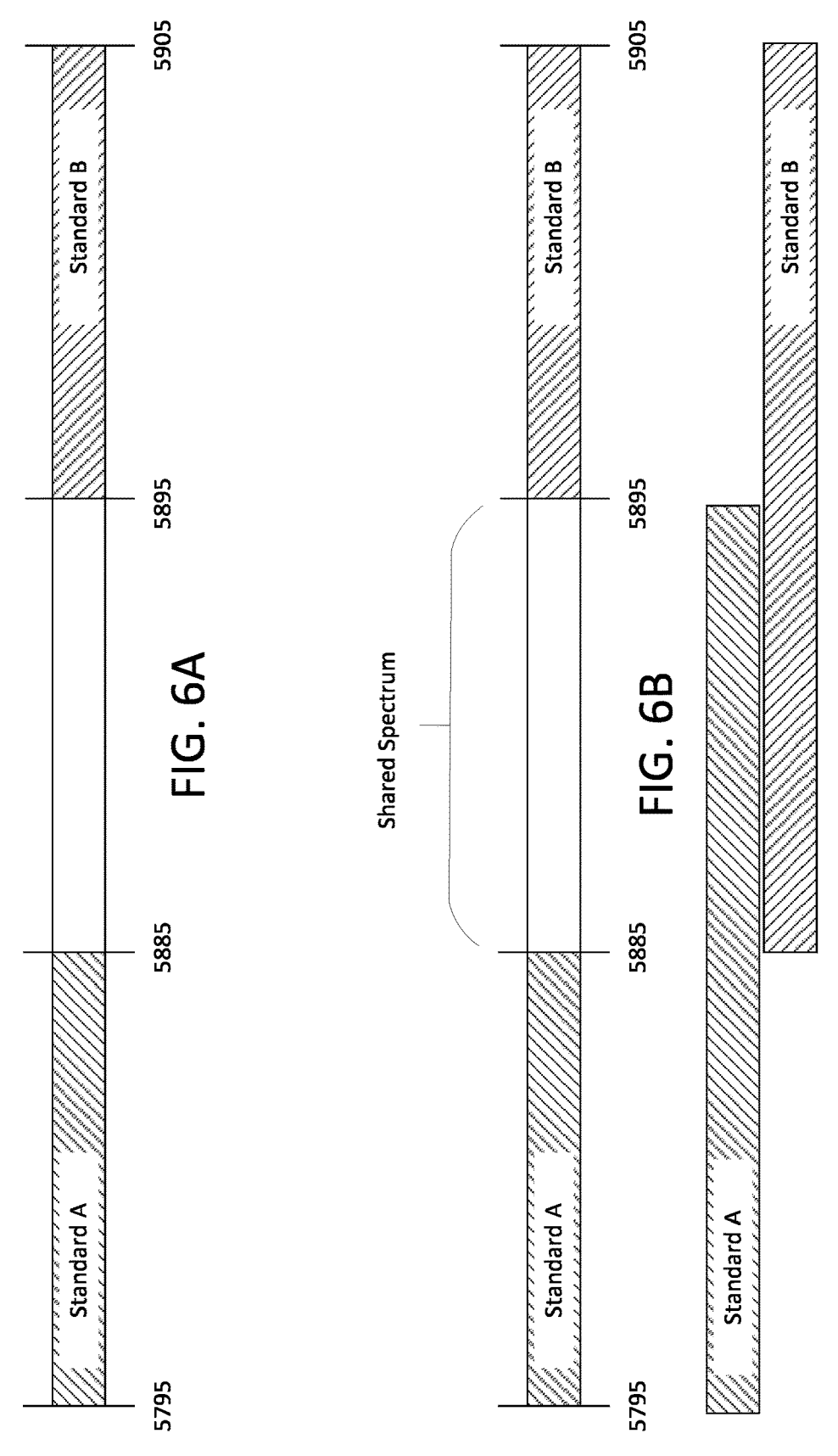
FIGS. 6A-6C illustrate respective phases of a proposed allocation of the 5875 MHz to 5905 MHz frequency band for use via both DSRC/ITS-G5 and LTE C-V2X communication standards.
Figure 6C:
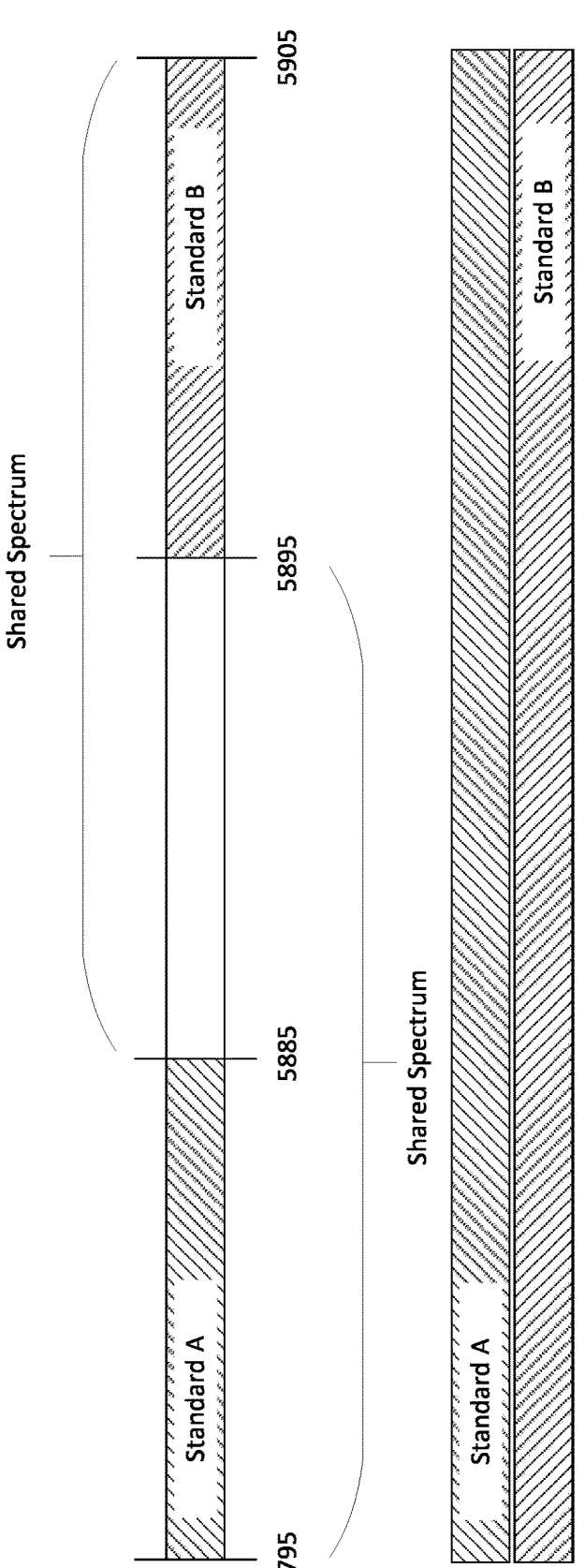

In one scenario, and with respect to the ITS safety band as shown in FIG. 2, the 5G Automotive Association (5GAA) has suggested an allocation of the 5875 MHz to 5905 MHz frequency band for use via both DSRC/ITS-G5 and LTE C-V2X (both of which are competing technologies in Europe) in 3 phases over time. These different phases are shown in FIGS. 6A-6C. As shown in FIG. 6A, phase one includes the sharing of 5.9 GHz ITS safety band via preferred 10 MHz channels. One communication standard (such as DSRC/ITS-G5) may exclusively utilize one of the dedicated 10 MHz channels, i.e. either the 10 MHz channel occupied by the 5875 MHz-5885 MHz. frequency band or the 10 MHz channel occupied by the 5895 MHz-5905 MHz frequency band, but not both. The other communication standard (such as LTE C-V2X) may exclusively use the other of these two dedicated 10 MHz channels.

However, in phase two it is suggested that the two communication standards still respectively utilize their dedicated 10 MHz channels as noted above for FIG. 6A, although a portion of the 5.9 GHz ITS safety band may be shared by either communication standard. This may be accomplished via the use of mutual detect- and vacate mechanisms.

Still further, and turning now to FIG. 6C, phase 3 proposes that the two communication standards still respectively utilize their dedicated 10 MHz channels as noted above for FIG. 6A, although the entirety of the 5.9 GHz ITS safety band may be shared by either communication standard. Again, this may be accomplished via the use of mutual detect- and vacate mechanisms, which is implemented in both communication standard technologies.

Thus, and as shown with respect to FIGS. 6A-6C, it is sufficient in phase one that one communication standard technology be configured for use in a single channel. For future phases two and three, however, dual-channel operation may be required. Moreover, phase three may require the use of triple channel operation if both technologies are able to access all three channels.

The proposed usage of the ITS safety band in future phases may present difficulties in that low-cost transceivers, which may be widely implemented as the wireless communication devices 102.1-102.N, may only be able to tune to one channel at a time. Thus, as the current solution is for a single radio to only listen on a single channel, information transmitted on other channels may be lost. This Section presents techniques that ensures that transmitted safety service messages will be received and processed in a robust and timely manner even when such a single-channel transceiver/receiver is implemented.

To do so, it is observed that three ITS safety channels of 10 MHz bandwidth each are available in the 5875 MHz-5905 MHz frequency band. Depending on the frequency allocation as noted above with respect to the various phases of adoption as shown in FIGS. 6A-6C, there may be 1, 2, or all 3 of the 10 MHz channels allocated for use by a single communication standard technology such as DSRC/ITS-G5, LTE C-V2X, 5G NR V2X, etc. This is further illustrated at the bottom of each of FIGS. 6B and 6C, which show possible channel allocations with respect to the use of the ITS safety band channels by each communication standard at various times. Based upon current communication standards at the time of this writing, a low-cost transceiver implementation such as one based upon the 3GPP Rel. 14 (released in Q2 of 2017) may only be able to process a single channel at a time, as noted above. Thus, the techniques described in this Section leverage the use of ITS data transmissions having different latency requirements to ensure that a wireless communication device 102.1-102.N may obtain all required safety information, which may be distributed over all 3 channels.

In accordance with various communication standards (such as ITS-G5, LTE C-V2X, etc.) the ITS safety band may be used to transmit safety service messages having different latency requirements. In other words, given the nature of the safety service message that is being transmitted, there is an emphasis placed on some types of safety service messages being received faster (i.e. with a lower latency) than others.

The particular communication standard that is used typically establishes latency requirements based upon the particular type of safety service message and/or other factors. In any event, safety service messages that need to meet what is referred to as an "ultra-low-latency" communication requirement (latency <10 ms, <15 ms, <20 ms, etc.) may include safety service messages for emergency braking, although such messages are not as common as other types of safety service messages that need to meet a more relaxed and higher latency requirement. Thus, when a safety service message must meet the ultra-low-latency communication requirement, current communication standards may require such messages to meet the ultra-low latency requirements such that the information encoded into such messages is immediately known to all vehicles independently of which channel the wireless communication devices 102.1-102.N are currently operating. Again, most use cases have much more relaxed latency requirements for the transmitted safety service messages, which are referred to as "medium-latency" communication requirements (around 100 ms or other suitable latency requirement such as 50 ms, 150 ms, etc.) and signal repetition rates >10 Hz. In these scenarios, the techniques as further discussed in this Section propose a slight increase to the repetition rate such that it is sufficient for the wireless communication devices 102.1-102.N to receive a second (or even third) transmission.

The techniques described in this Section are presented below with reference to two different latency requirements, which may be defined in accordance with an appropriate the wireless communication devices 102.1-102.N standard. These techniques may be performed via one or more (or all) of the wireless communication devices 102.1-102.N as shown and discussed herein with respect to FIG. 1. The techniques described in this Section are not limited to the use of two latency requirements or the latency requirements defined by a specific communication standard. Instead, the techniques described in this Section may be any suitable latency requirements or other metrics that dictate a timeliness of when certain messages need to be received by other wireless communication devices.

Low Latency Safety Service Message Transmission

Figure 7A:
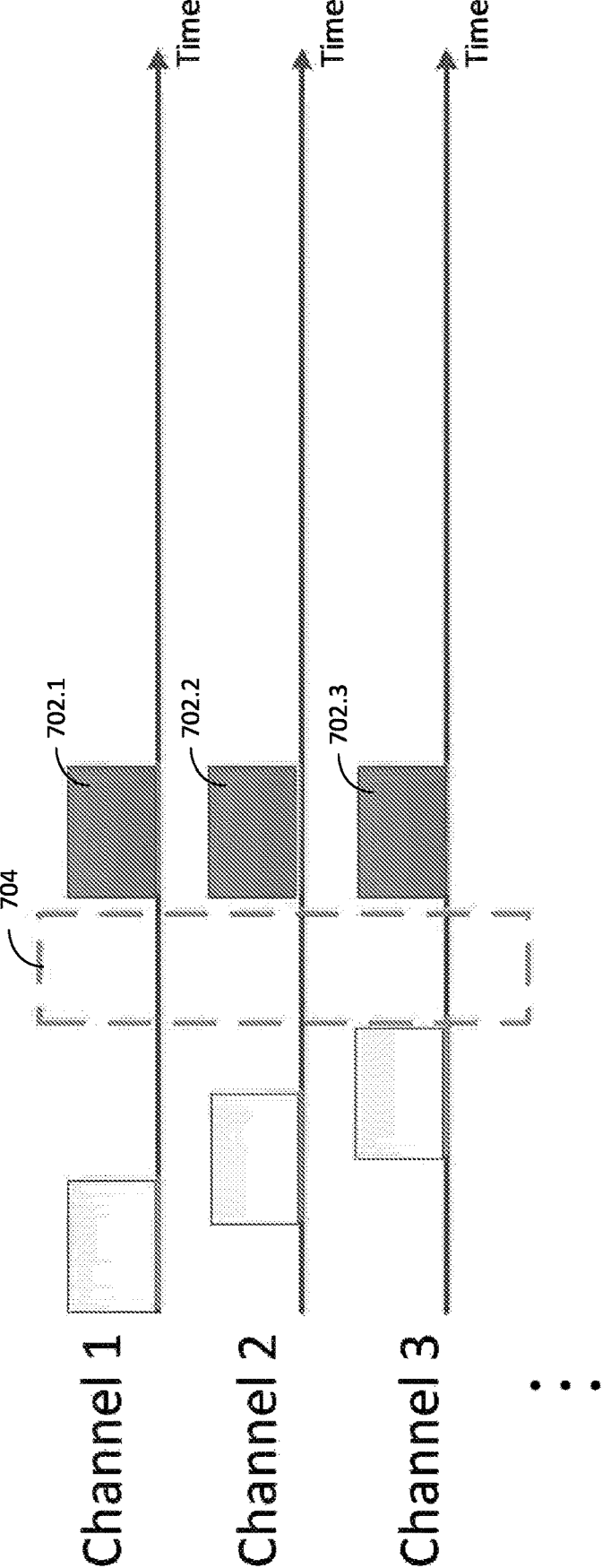
FIGS. 7A-7C illustrate respective transmission schedules for the transmission of safety service messages to meet low latency requirements, in accordance with the disclosure.
Figure 7B:
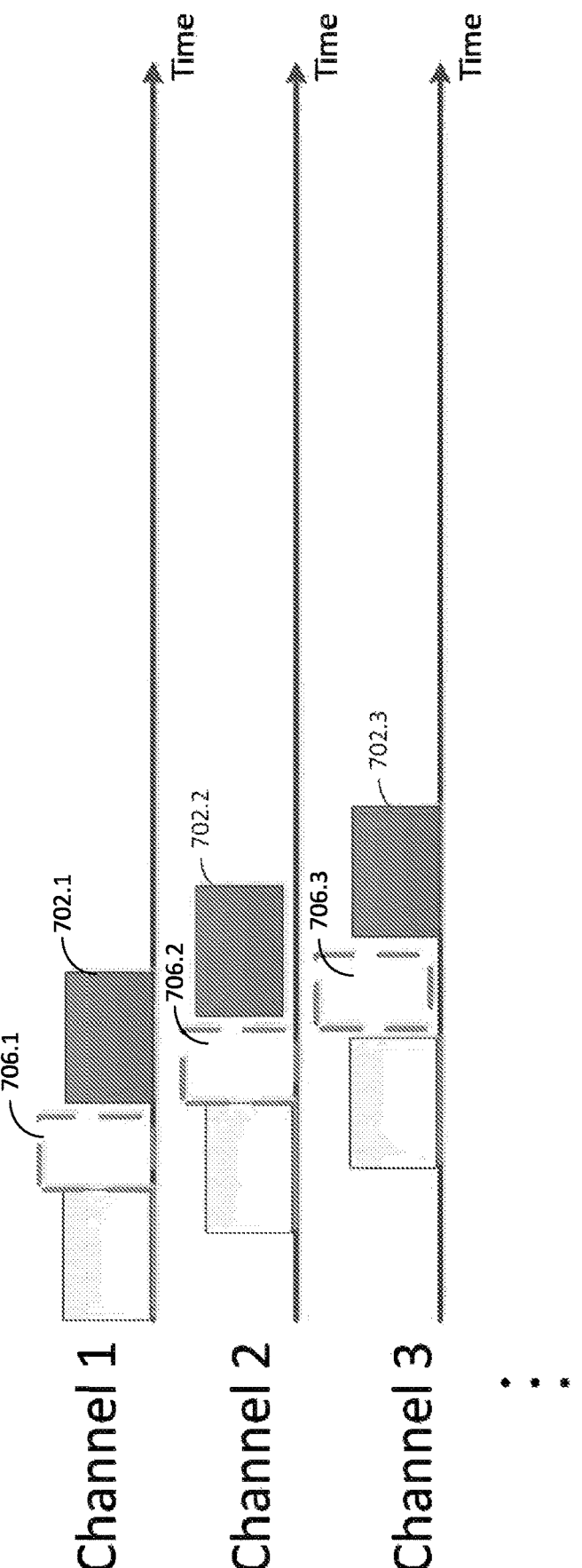
Figure 7C:
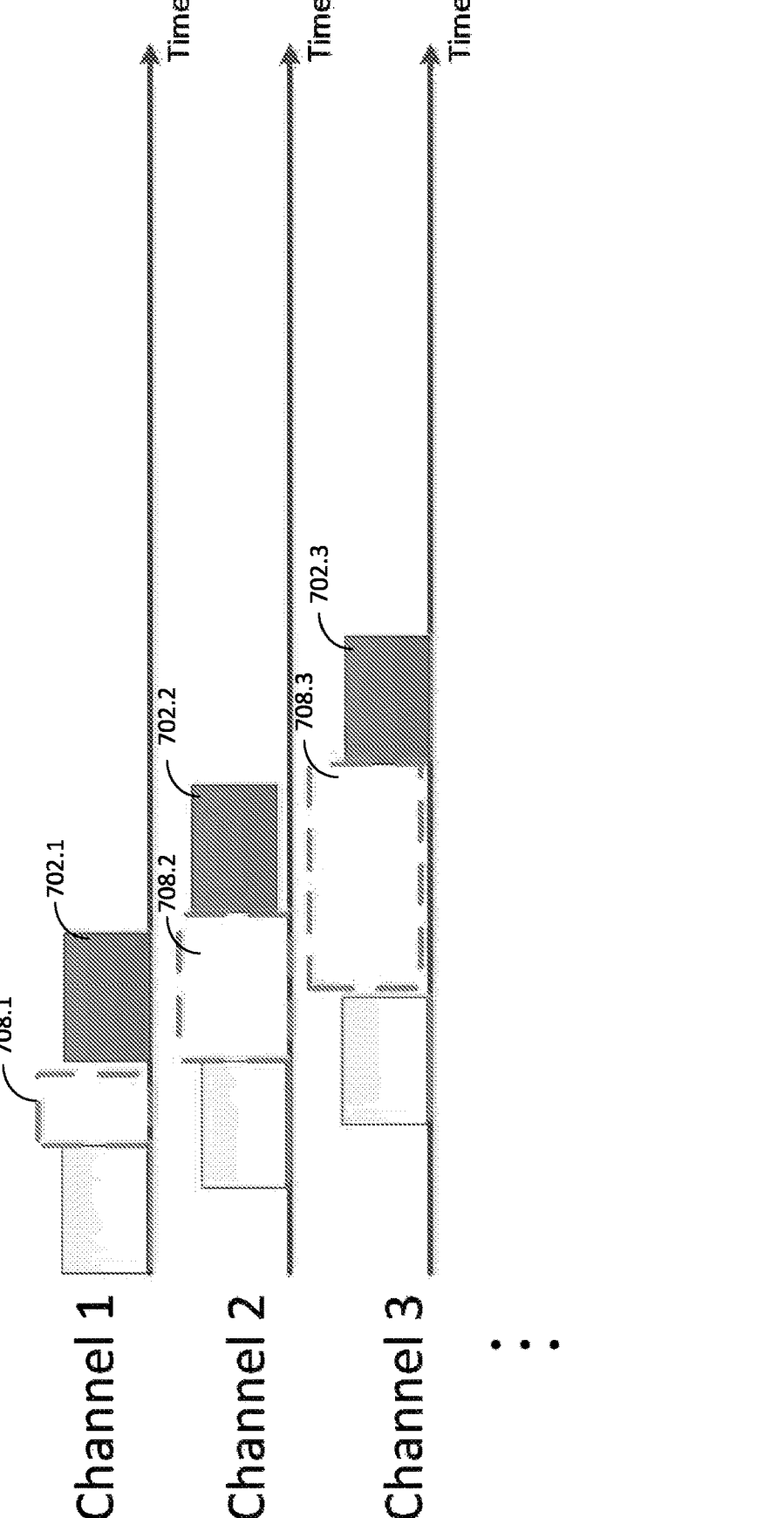

For the transmission of safety service messages that are required to meet a lower latency communication requirement (such as the ultra-low latency requirement noted above), a wireless communication device 102 may transmit such safety service messages over one or more channels in accordance with a transmission schedule, with additional details of the transmission schedule being described further herein with reference to FIGS. 7A-7C. The three channels as shown in FIGS. 7A-7C (and FIG. 8) may correspond to three separate 10 MHz channels within the ITS Safety band as noted herein. The current Section provides various transmission schedule options with respect to FIGS. 7A-7C, with a wireless communication device 102 selecting any one of these transmission schedules based upon the particular application and/or implementation. A wireless communication device 102 may further select a particular transmission schedule based upon a predetermined prioritization scheme and/or which transmission schedule allows for the safety service messages to be transmitted to satisfy the low latency requirement defined by the appropriate communication standard.

The safety service messages 702.1-702.3 may represent any suitable type of message with encoded data, which may be packetized and transmitted in accordance with any suitable type of communication standard and accompanying communication protocol. In various scenarios, the safety service messages may include CAMs (Cooperative Awareness Messages), DENMs (Decentralized Environmental Notification Messages), BSMs (Basic Safety Messages, mainly used in the US), etc. The safety service messages 702.1-702.3 may each encode the same message content and thus represent redundant safety service messages to ensure the receipt of at least one safety service message by another wireless communication device 102. In one scenario, the safety service messages 702.1-702.3 may comprise safety service messages transmitted in accordance with the ITS/G5 or LTE C-V2X communication standard, and which need to satisfy the ultra-low-latency communication requirement as noted herein.

Although three safety service messages 702.1-702.3 are shown in FIGS. 7A-7C, with one being transmitted per channel, the actual number of transmitted safety service messages 702 may vary depending upon the number of channels currently used by the wireless communication device 102.1-102.N within the ITS safety band (or other suitable frequency band) and in accordance with a particular wireless communication standard. In any event, the processing circuitry of an appropriate wireless communication device 102.1-102.N is configured to cause the transmitter of a wireless communication device 102 to transmit the safety service messages 702.1-702.3 in accordance with a transmission schedule that results in the transmission of each safety service message using a respective channel, which may include a 10 MHz channel in the ITS safety band as discussed herein.

A first transmission schedule 700 is shown in FIG. 7A and represents a simultaneous safety service message transmission schedule. The simultaneous safety service message transmission schedule 700 represents a timeline in which a wireless communication device 102 transmits safety service messages 702.1-702.3, each on a respective 10 MHz channel within the ITS safety band as noted above with reference to FIGS. 6A-6C. In accordance with such a scenario, it is assumed that a wireless communication device 102.1-102.N is using the entire 30 MHz ITS safety band and three accompanying 10 MHz channels. The wireless communication device 102.1-102.N thus transmits the redundant safety service messages 702.1-702.3, with one safety service message 702.1-702.3 per allocated channel, using the entire ITS safety band based upon the particular wireless communication standard that is currently implemented by the wireless communication device 102.

To do so, a wireless communication device 102 may perform any suitable type of channel monitoring technique to identify a transmission opportunity 704 (such as the start of a scheduled time slot) in which each of the channels is available for a safety service message transmission. This may include the use of Listen Before Talk (LBT) on each of the channels used for the transmission of the safety service messages 702.1-702.3. Of course, other suitable types of channel monitoring may be implemented depending upon the particular wireless communication standard. In various scenarios, alternatives to LBT to identify transmission opportunities may include an a-priori negotiation of the channel usage, Detect-and-Vacate techniques, semi-persistent scheduling based channel access, etc. In any event, once the transmission opportunity 704 is detected for all channels, the wireless communication device 102 simultaneously transmits each of the safety service messages 702.1-702.3, one per channel, as shown in FIG. 7A. The simultaneous transmission of the safety service messages 702.1-702.3 may be performed in accordance with any suitable transmission technique depending upon the particular wireless communication standard that is implemented by the wireless communication device 102 that is performing the transmission, which may include the use of carrier aggregation (CA) techniques to do so.

A second transmission schedule 720 is shown in FIG. 7B and represents an opportunistic safety service message transmission schedule. The opportunistic safety service message transmission schedule 720 represents a timeline in which a wireless communication device 102 transmits safety service messages 702.1-702.3, each on a respective 10 MHz channel within the ITS safety band as noted above with reference to FIGS. 6A-6C. Again, it is assumed that a wireless communication device 102.1-102.N is using the entire 30 MHz ITS safety band and the accompanying three 10 MHz channels. Similar to the simultaneous safety service message transmission schedule 700 as shown in FIG. 7A, the opportunistic safety service message transmission schedule 720 results in the wireless communication device 102.1-102.N transmitting the redundant safety service messages 702.1-702.3, one per allocated channel, using the entire ITS safety band based upon the particular wireless communication standard that is currently implemented by the wireless communication device 102.

However, the opportunistic safety service message transmission schedule 720 may be realized via the processing circuitry of a wireless communication device 102 independently performing any suitable type of channel monitoring technique on each channel to identify respective per-channel transmission opportunities 706.1-706.3. The per-channel transmission opportunities 706.1-706.3 thus respectively represent, independently for each channel, the start of a time slot to transmit each respective safety service message 702.1-702.3. As noted for the simultaneous safety service message transmission schedule 700, the opportunistic safety service message transmission schedule 720 may include the use of any suitable type of channel monitoring, which may include LBT. In this scenario, the LBT (or other suitable channel monitoring technique) may be performed on each of the channels used for the transmission of the safety service messages 702.1-702.3. In any event, and because the transmission opportunities 706.1-706.3 are detected for all channels independently of one another, this may (but not necessarily) result in the sequential transmission of the safety service messages 702.1-702.3 via each of the channels, as shown in FIG. 7B. In such a case, the opportunistic safety service message transmission schedule 720 may result in the transmission of safety services messages such that a portion (or the entirety) of two or more of the safety service messages overlap in time with one another on different channels. Again, the transmission of the safety service messages 702.1-702.3 may be performed in accordance with any suitable transmission technique depending upon the particular wireless communication standard that is implemented by the wireless communication device 102 that is performing the transmission, which may include the use of carrier aggregation (CA) techniques to do so.

A third transmission schedule 740 is shown in FIG. 7C and represents a sequential safety service message transmission schedule. The sequential safety service message transmission schedule 740 represents a timeline in which a wireless communication device 102 transmits safety service messages 702.1-702.3, each on a respective 10 MHz channel within the ITS safety band as noted above with reference to FIGS. 6A-6C. Again, it is assumed that a wireless communication device 102.1-102.N is using the entire 30 MHz ITS safety band and accompanying three 10 MHz channels. Similar to the opportunistic safety service message transmission schedule 720 as shown in FIG. 7B, the sequential safety service message transmission schedule 740 results in the wireless communication device 102.1-102.N transmitting the redundant safety service messages 702.1-702.3, one per allocated channel, using the entire ITS safety band based upon the particular wireless communication standard that is currently implemented by the wireless communication device 102.

Also, and like the opportunistic safety service message transmission schedule 720 as shown in FIG. 7B, the sequential safety service message transmission schedule 740 may be realized via a wireless communication device 102 independently performing any suitable type of channel monitoring technique on each channel to identify respective per-channel transmission opportunities 708.1-708.3. The per-channel transmission opportunities 708.1-708.3 thus respectively represent, for each channel independently, the start of a time slot to transmit each respective safety service message 702.1-702.3. The sequential safety service message transmission schedule 740 may include the use of any suitable type of channel monitoring, which may include LBT. In this scenario, the LBT (or other suitable channel monitoring technique) may be performed on each of the channels used for the transmission of the safety service messages 702.1-702.3.

However, unlike the opportunistic safety service message transmission schedule 720 as shown in FIG. 7B, a wireless communication device 102 transmitting the safety service messages 702.1-702.3 using the sequential safety service message transmission schedule 740 may hold additional transmissions until transmissions via other channels has terminated. Thus, and as shown in FIG. 7C, this may result in a sequential transmission of the safety service messages 702.1-702.3, with each transmission occurring upon the termination of the safety message transmission on a different channel. The channels may be prioritized in any suitable manner to facilitate such a transmission schedule. As a result, the safety service messages 702.1-702.3 are transmitted sequentially, one per channel, with none of the safety service messages 702.1-702.3 overlapping in time with the transmission of other safety service messages 702.1-702.3, as shown in FIG. 7C. Because the transmissions do not overlap, the sequential safety service message transmission schedule 740 may be particularly advantageous for use in a single-channel transmitter, as such a transmitter may be configured to transmit on a single channel at time.

In this way, regardless of which of the transmission schedules 700, 720, 740 is used by a wireless communication device 102, the transmissions of ultra-low-latency packets transmitted as part of the safety service messages 702.1-702.3 will be received a single-channel receiver, as the safety service messages are transmitter over each of the available channels. Again, the transmission of the safety service messages 702.1-702.3 may be performed in accordance with any suitable transmission technique depending upon the particular wireless communication standard that is implemented by the wireless communication device 102 that is performing the transmission. Although carrier aggregation (CA) techniques may be used, the use of the sequential safety service message transmission schedule 740 may not require such techniques as simultaneous transmissions are not used. This may also be the case for the opportunistic safety service message transmission schedule 720 is simultaneous transmissions are not utilized.

Figure 8:
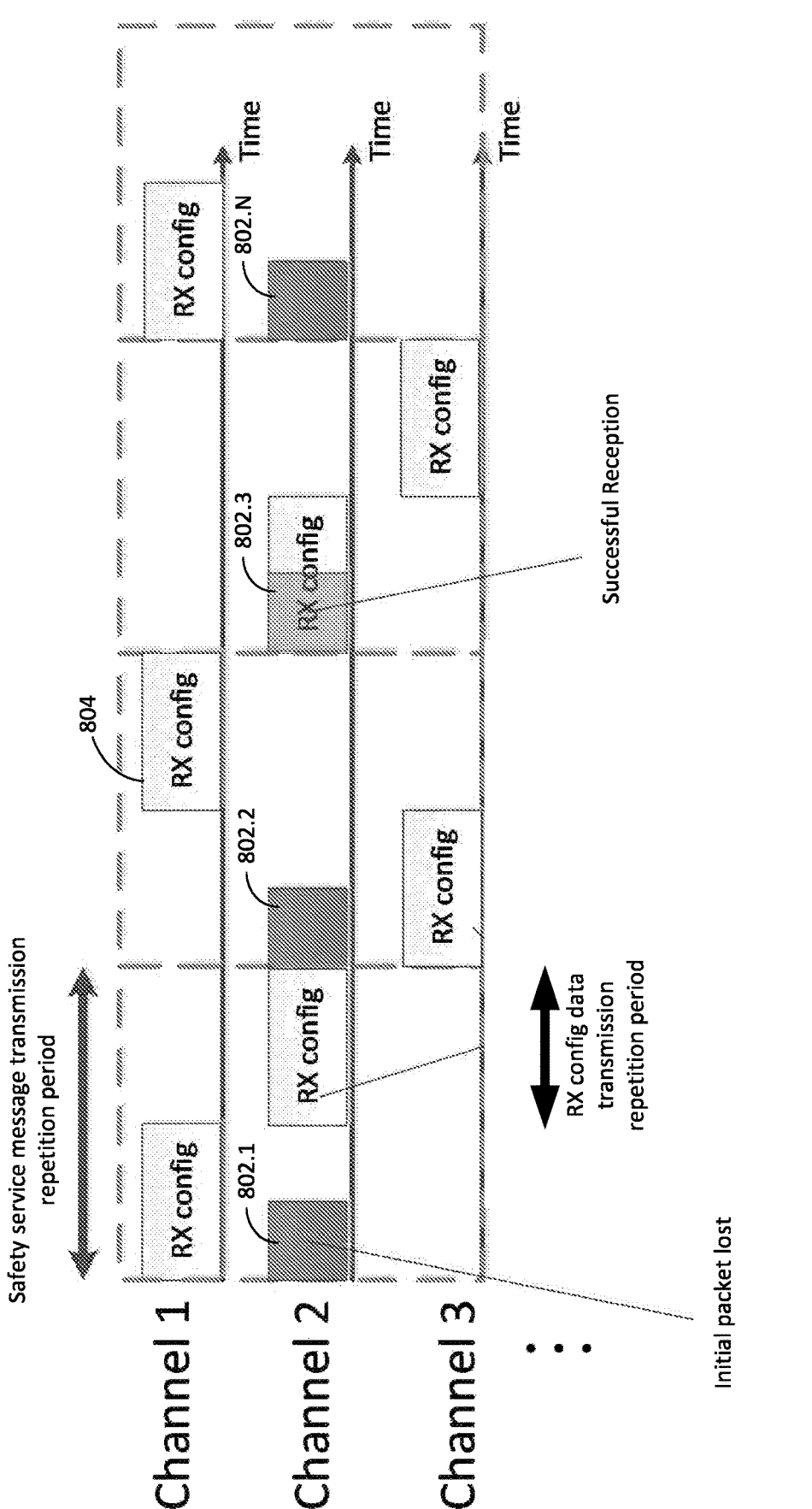
FIG. 8 illustrates a transmission schedule for the transmission of safety service messages to meet medium latency requirements, in accordance with the disclosure.

Any suitable communication standard and accompanying protocol may be implemented to facilitate the transmission of the safety service messages 702.1-702.3 as discussed with respect to FIGS. 7A-7C as well as the transmission of other types of data as discussed further below with respect to FIG. 8. This may include the use of the aforementioned proposed 3.8-4.2 GHz frequency band. Moreover, it is noted that for NR-V2X, CA is defined for 20/30/40 MHz of bandwidth, and thus these bands may be implemented in accordance with the techniques discussed herein to facilitate the transmission of the safety service messages 702.1-702.3 (and additionally or alternatively data transmitted using the transmission schedule 800 as shown in FIG. 8 and further discussed below). Alternatively, the ETSI defined "Multi Channel Operation (MCO)" approach may be applied to facilitate the transmission of the safety service messages 702.1-702.3 (and additionally or alternatively data transmitted using the transmission schedule 800 as shown in FIG. 8 and further discussed below).

Medium Latency Safety Service Message Transmission

Again, lower-cost transceivers may only access a single channel at a time. Thus, for the transmission of safety service messages that are required to meet the medium (or higher) latency communication requirement, a wireless communication device 102 may transmit such medium-latency safety service messages in accordance with a different transmission schedule, with additional details of the transmission schedule being described further herein with reference to FIG. 8. The transmission schedule as shown and discussed herein with respect to FIG. 8 may be implemented by a wireless communication device 102, and may be implemented in combination of the transmission schedules 700, 720, 740 as discussed herein. In other words, a wireless communication device 102 may transmit low latency safety service messages by selecting one of the transmission schedules 700, 720, 740, and transmit medium latency safety service messages using the transmission schedule 800 as shown in FIG. 8.

Instead of the use of each of the available channels for transmission, the higher latency requirement allows for the sequential and repetitive transmission of the safety service messages 802.1-802.N over a single channel as shown in FIG. 8. The safety service messages 802.1-802.N may represent any suitable type of messages with encoded data, which may be packetized and transmitted in accordance with any suitable type of communication standard and accompanying communication protocol. The safety service messages 802.1-802.N may represent the same encoded message content and thus represent any suitable number N of redundant safety service messages to ensure the receipt of at least one safety service message by another wireless communication device 102. In one scenario, the safety service messages 802.1-802.N may comprise safety service messages transmitted in accordance with the ITS/G5 or LTE C-V2X communication standard, and which need to satisfy the medium-latency communication requirement as noted herein. The channel selected for the transmission of the safety service messages 802.1-802.N may be random, a currently-tuned channel used by a wireless communication device 102, a channel that is selected in accordance with a predetermined channel prioritization scheme, etc.

Because the safety service messages 802.1-802.N are transmitted over a single channel, a wireless communication device 102 that is tuned to a different channel may not receive the transmitted safety service messages 8021-802.N.

Therefore, the transmission schedule 800 as shown in FIG. 8 functions to repetitively transmit additional data over each of the available channels, which is shown in FIG. 8 as the receiver configuration data (RX Config) 804. The receiver configuration data 804 may represent any suitable type of encoded information that instructs a receiving wireless communication device 102.1-102.N to tune to a specific channel to listen for transmitted safety service messages 802. The receiver configuration data 804 may be packetized and transmitted in accordance with any suitable type of communication standard and accompanying communication protocol, which may be the same communication standard and/or protocol used to transmit the safety service messages 802.1-802.N.

The safety service messages 8021-802.N are repetitively transmitted over the same channel, whereas the receiver configuration data 804 is transmitted over each of the available channels in a cyclical manner. In other words, the receiver configuration data 804 is transmitted using each of the channels by switching, after the transmission, the channel used for the next transmission. The sequence in which the channels are switched in this manner may follow any suitable type of predetermined pattern or prioritized switching schedule, and which may alternatively or additionally be defined in accordance with the same communication standard and/or protocol used to transmit the safety service messages 802.1-802.N.

Thus, and with continued reference to FIG. 8, the safety service messages 802.1-802.N may be repetitively and periodically transmitted over the same channel in accordance with a safety service message transmission repetition period, which represents a time period identified with a safety service message transmission frequency. The safety service message transmission frequency or rate may be any suitable frequency depending upon the particular application, message type, etc., and may be defined in accordance with the particular communication standard that is used for transmission of the safety service messages 802.1-802.N. The receiver configuration data 804 may be repetitively transmitted over different channels in a cyclical manner in accordance with a receiver configuration data transmission repetition period, which represents a time period identified with a receiver configuration data transmission frequency. Thus, the receiver configuration data transmission frequency represents a frequency associated with successive receiver configuration data transmissions, each occurring over a different channel.

The receiver configuration data transmission frequency be higher than the safety service message transmission frequency such that the receiver configuration data 804 is transmitted more frequently than the safety service messages 802.1-802.N. The receiver configuration data transmission frequency may be any suitable frequency depending upon the particular application and/or may be a multiple of the safety service message transmission frequency to ensure that safety service messages 802.1-802.N are timely received after a maximum predetermined number of transmissions. That is, and as shown in FIG. 8, the receiver configuration data transmission frequency is twice the safety service message transmission frequency. However, this is not a limiting scenario and the receiver configuration data transmission frequency may be any suitable frequency such as three times, one-and-a-half times, etc. In selecting the receiver configuration data transmission frequency, a tradeoff may be recognized between the power and resources needed for more frequent receiver configuration data transmissions and the time needed for the wireless communication devices 102.1-102.N to receive the safety service messages 802.1-802.N for less frequent receiver configuration data transmissions.

A wireless communication device 102 implementing the transmission schedule 800 may calculate and/or dynamically adapt the receiver configuration data transmission frequency based upon the current safety service message transmission frequency. That is, a wireless communication device 102.1-102.N may calculate a currently-implemented safety service message transmission frequency (typically 100 ms or faster, which may be defined in accordance with the communication standard or determined via transmission data monitoring) and then switch the channel at twice that frequency (or another suitable multiple of the safety service message transmission frequency). In this way, and as illustrated in further detail in FIG. 8, an initial safety service message 802.1 may not be received by a wireless communication device 102 and be lost if the receiving wireless communication device 102 is tuned to channel 1 (such as 5795 MHz-5885 MHz) or channel 3 (such as 5895 MHz-5905 MHz). However, the transmission of the receiver configuration data 804 at the higher receiver configuration data transmission frequency ensures that a receiving wireless communication device 102 will receive the redundant subsequent transmission of the safety service message 802.3 within a time period that represents two safety service message transmission repetition periods (in this particular scenario).

Wireless Communication Device Architecture

Referring now back to FIG. 5, the memory 508 may further store any suitable type of data used to transmit safety service messages to meet any suitable type of latency requirement. This may include the aforementioned preferred channel data, a prioritization of channels for such transmissions, a prioritization of specific transmission schedules for specific types of safety service messages, etc. The memory 508 may additionally store data with respect to the safety service message transmission frequency, the receiver configuration data transmission frequency, a relationship between these two frequencies such that the receiver configuration data transmission frequency may be determined, etc. To do so, the memory 508 may include a transmission schedule management engine 514. The transmission schedule management engine 514 may represent a functional realization of the techniques as described herein with respect to Section II, such as the use of the transmission schedules 700, 720, 740, 800 by a wireless communication device 102.1-102.N as discussed herein with respect to FIGS. 7A-7C and 8. The transmission schedule management engine 514 comprises a low latency transmission schedule processing module 515 and a medium latency transmission schedule processing module 517.

The executable instructions stored in the low latency transmission schedule processing module 515 may facilitate, in conjunction with execution via the processing circuitry 502, the device 500 identifying the transmission of safety service messages 702 that need to meet an ultra-low latency requirement (or other suitable latency requirement) for transmission, as discussed herein. Once identified, the executable instructions stored in the low latency transmission schedule processing module 515 may facilitate, in conjunction with execution via the processing circuitry 502, the device 500 selecting an appropriate transmission schedule 700, 720, 740. This may depend upon the particular application and/or implementation. In one scenario, if the transceiver 504 is configured as a single-channel transmitter, then the device 500 may select the use of the transmission schedule 740 as discussed herein with reference to FIG. 7C. However, if the transceiver 504 is configured as a multi-channel transmitter, then the device 500 may select the use of one of the transmission schedules 700, 720 as discussed herein with reference to FIGS. 7A-7B.

The executable instructions stored in the medium latency transmission schedule processing module 517 may facilitate, in conjunction with execution via the processing circuitry 502, the device 500 identifying the transmission of safety service messages 802 that need to meet a medium latency requirement (or other suitable latency requirement) for transmission, as discussed herein. Once identified, the executable instructions stored in the medium latency transmission schedule processing module 517 may facilitate, in conjunction with execution via the processing circuitry 502, the device 500 selecting the transmission schedule 800 for the transmission of safety service messages 802 and receiver configuration data 804. This may further include the identification of the safety service message transmission frequency and the receiver configuration data transmission frequency as discussed herein with respect to FIG. 8.

General Operation of a Wireless Communication Device

A device is provided. With reference to FIG. 5, the device includes a transmitter configured to transmit first safety service messages and second safety service messages in accordance with a communication protocol that defines a plurality of channels, the first safety service messages being transmitted with a lower latency requirement than the second safety service messages; and processing circuitry configured to cause the transmitter to transmit the first and second safety service messages in accordance with a transmission schedule that results in the transmitter (i) transmitting each respective one of the first safety service messages using a respective one of the plurality of channels, and (ii) sequentially transmitting each respective one of the second safety service messages using a first channel from among the plurality of channels. The transmission schedule results in the transmitter transmitting the first safety service messages simultaneously via each respective one of the plurality of channels. In addition or in alternative to and in any combination with the optional features previously explained in this paragraph, the transmission schedule results in the transmitter transmitting the first safety service messages sequentially via each of the plurality of channels such that a portion of at least two of the first safety service messages overlap in time with one another on different channels from among the plurality of channels. In addition or in alternative to and in any combination with the optional features previously explained in this paragraph, the processing circuitry is configured to cause the device to perform a Listen Before Talk (LBT) operation on each one of the plurality of channels in accordance with the communication protocol, and to cause the transmitter to transmit the first safety service messages sequentially via each of the plurality of channels by determining channel availability on each one of the plurality of channels in accordance with the LBT operation. In addition or in alternative to and in any combination with the optional features previously explained in this paragraph, the transmission schedule results in the transmitter transmitting the first safety service messages sequentially via each of the plurality of transmission channels such that none of the redundant first safety service messages overlap in time with one another. In addition or in alternative to and in any combination with the optional features previously explained in this paragraph, the transmission schedule results in the transmitter repeatedly transmitting the second safety service messages on the first channel in accordance with a safety service message transmission frequency as defined by the communication protocol. In addition or in alternative to and in any combination with the optional features previously explained in this paragraph, the transmission schedule further results in the transmitter sequentially transmitting receiver configuration data using each of the plurality of channels in accordance with a receiver configuration transmission frequency that is higher than the safety service message transmission frequency, the receiver configuration data instructing another device receiving the second safety service messages to use the first channel to receive the second safety service messages. In addition or in alternative to and in any combination with the optional features previously explained in this paragraph, the transmitter sequentially transmits the receiver configuration data using each of the plurality of channels by switching, after each receiver configuration data transmission, the channel from among the plurality of channels used to transmit the receiver configuration data.

Combination of the Implementation of Techniques

The techniques discussed herein were separately discussed in each of the Sections I and II for ease of explanation. However, the techniques described herein may be combined such that a single device (such as the wireless communication devices 102.1-102.N, 500, etc.) may implement both techniques. This is illustrated in FIG. 5 via the wireless communication device 500 implementing both the simultaneous transmission management techniques, as discussed herein with reference to Section I, and the transmission schedule management techniques, as discussed herein with reference to Section II. Alternatively, a single wireless communication device (such as the wireless communication devices 102.1-102.N, 500, etc.) may implement the simultaneous transmission management techniques or the transmission schedule management techniques without necessarily implementing both techniques.

Wireless Communication Use Cases

Any of the radio links as described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V21) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

The various techniques described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

The various techniques described herein may also implement a hierarchical application of the scheme is possible, such as by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

The various techniques described herein may also be applied to different Single Carrier or OFDM types (CP- OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources].

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. That is, some or all features defined for network equipment may be implemented by a suitable UE.

EXAMPLES

The following examples pertain to various techniques of the present disclosure.

An example (e.g. example 1) relates to a device. The device includes a transmitter configured to transmit data using a first frequency band in accordance with a first communication protocol; and processing circuitry configured to select at least one predetermined out of band emission protection mechanisms based upon a detected number of device data transmissions over the first frequency band. The at least one predetermined out of band emission protection mechanisms respectively define one or more transmission parameters causing an aggregation of out of band emissions caused by the device data transmissions over the first frequency band, which are introduced into a second frequency band associated with a second communication protocol, to meet a predetermined out of band emission threshold requirement, and the processing circuitry is further configured to cause the transmitter to use the selected one of the set of predetermined out of band emission protection mechanisms to transmit data over the first frequency band.

Another example (e.g. example 2) relates to a previously-described example (e.g. example 1), wherein the processing circuitry is configured to select, when the detected number of device data transmissions using the first frequency band is two or greater, a first one of the at least one predetermined out of band emission protection mechanisms that define one or more transmission parameters associated with a reduced transmission output power level for the transmitter.

Another example (e.g. example 3) relates to a previously-described example (e.g. one or more of examples 1-2), wherein the use of the first predetermined out of band emission protection mechanism results in the transmitter reducing a transmission output power level.

Another example (e.g. example 4) relates to a previously-described example (e.g. one or more of examples 1-3), wherein the device is part of a wireless network that services the device and a further device, and wherein the number of device data transmissions over the first frequency band is detected via the further device and transmitted to the device.

Another example (e.g. example 5) relates to a previously-described example (e.g. one or more of examples 1-4), wherein the device is serviced by a wireless network, and wherein the number of device data transmissions over the first frequency band is detected via a network node of the wireless network and transmitted to the device.

Another example (e.g. example 6) relates to a previously-described example (e.g. one or more of examples 1-5), wherein the processing circuitry is further configured to determine the reduced transmission output power level based upon a power spectral density (PSD) threshold requirement defined by the first communication protocol in accordance with data transmissions over the first frequency band.

Another example (e.g. example 7) relates to a previously-described example (e.g. one or more of examples 1-6), wherein the processing circuitry is configured to select a second one of the at least one predetermined out of band emission protection mechanisms when the use of the first predetermined out of band emission protection mechanism by the transmitter results in the aggregation of out of band emissions caused by the device data transmissions over the first frequency band to exceed the predetermined out of band emission threshold requirement.

Another example (e.g. example 8) relates to a previously-described example (e.g. one or more of examples 1-7), wherein the second predetermined out of band emission protection mechanism defines one or more transmission parameters associated with a further reduced transmission output power level for the transmitter.

Another example (e.g. example 9) relates to a previously-described example (e.g. one or more of examples 1-8), wherein the second predetermined out of band emission protection mechanism defines one or more transmission parameters associated with a reduction in a frequency of data repetitively transmitted via the transmitter using the first frequency band.

An example (e.g. example 10) is a device. The device includes a transceiver configured to transmit data using a first frequency band in accordance with a first communication protocol; and processing circuitry configured to: select at least one predetermined out of band emission protection mechanisms based upon an identified number of device data transmissions using the first frequency band in accordance with a first communication protocol, the number of device data transmissions being determined in accordance with a transmission schedule. The at least one predetermined out of band emission protection mechanisms define one or more one or more transmission parameters that cause an aggregation of out of band emissions caused by the device data transmissions over the first frequency band, which are introduced into a second frequency band associated with a second communication protocol, to meet a predetermined out of band emission threshold requirement. The transceiver is configured to receive a control signal that causes the transceiver to use the selected at least one of the set of predetermined out of band emission protection mechanisms to transmit data over the first frequency band.

Another example (e.g. example 11) relates to a previously-described example (e.g. example 10), wherein the processing circuitry is configured to select, when the identified number of device data transmissions using the first frequency band is two or greater, a first one of the at least one predetermined out of band emission protection mechanisms that define one or more transmission parameters associated with a reduced transmission output power level for the transceiver.

Another example (e.g. example 12) relates to a previously-described example (e.g. one or more of examples 10-11), wherein the selection of the first predetermined out of band emission protection mechanism results in the transceiver reducing a transmission output power level for transmitting data using the first frequency band.

Another example (e.g. example 13) relates to a previously-described example (e.g. one or more of examples 10-12), wherein the reduced transmission output power level is based upon a power spectral density (PSD) threshold requirement defined by the first communication protocol in accordance with data transmissions over the first frequency band.

Another example (e.g. example 14) relates to a previously-described example (e.g. one or more of examples 10-13), wherein the processing circuitry is configured to select a second one of the at least one predetermined out of band emission protection mechanisms when the use of the first predetermined out of band emission protection mechanism by the transceiver results in the aggregation of out of band emissions caused by the device data transmissions over the first frequency band to exceed the predetermined out of band emission threshold requirement.

Another example (e.g. example 15) relates to a previously-described example (e.g. one or more of examples 10-14), wherein the second predetermined out of band emission protection mechanism defines one or more transmission parameters associated with a further reduced transmission output power level for the transceiver.

Another example (e.g. example 16) relates to a previously-described example (e.g. one or more of examples 10-15), wherein the second predetermined out of band emission protection mechanism defines one or more transmission parameters associated with a reduction in a frequency of data repetitively transmitted via the transceiver using the first frequency band.

An example (e.g. example 17) relates to a device. The device includes a transmitter configured to transmit first safety service messages and second safety service messages in accordance with a communication protocol that defines a plurality of channels, the first safety service messages being transmitted with a lower latency requirement than the second safety service messages; and processing circuitry configured to cause the transmitter to transmit the first and second safety service messages in accordance with a transmission schedule that results in the transmitter (i) transmitting each respective one of the first safety service messages using a respective one of the plurality of channels, and (ii) sequentially transmitting each respective one of the second safety service messages using a first channel from among the plurality of channels.

Another example (e.g. example 18) relates to a previously-described example (e.g. example 17), wherein the transmission schedule results in the transmitter transmitting the first safety service messages simultaneously via each respective one of the plurality of channels.

Another example (e.g. example 19) relates to a previously-described example (e.g. one or more of examples 17-18), wherein the transmission schedule results in the transmitter transmitting the first safety service messages sequentially via each of the plurality of channels such that a portion of at least two of the first safety service messages overlap in time with one another on different channels from among the plurality of channels.

Another example (e.g. example 20) relates to a previously-described example (e.g. one or more of examples 17-19), wherein the processing circuitry is configured to cause the device to perform a Listen Before Talk (LBT) operation on each one of the plurality of channels in accordance with the communication protocol, and to cause the transmitter to transmit the first safety service messages sequentially via each of the plurality of channels by determining channel availability on each one of the plurality of channels in accordance with the LBT operation.

Another example (e.g. example 21) relates to a previously-described example (e.g. one or more of examples 17-20), wherein the transmission schedule results in the transmitter transmitting the first safety service messages sequentially via each of the plurality of transmission channels such that none of the redundant first safety service messages overlap in time with one another.

Another example (e.g. example 22) relates to a previously-described example (e.g. one or more of examples 17-21), wherein the transmission schedule results in the transmitter repeatedly transmitting the second safety service messages on the first channel in accordance with a safety service message transmission frequency as defined by the communication protocol.

Another example (e.g. example 23) relates to a previously-described example (e.g. one or more of examples 17-22), wherein the transmission schedule further results in the transmitter sequentially transmitting receiver configuration data using each of the plurality of channels in accordance with a receiver configuration transmission frequency that is higher than the safety service message transmission frequency, the receiver configuration data instructing another device receiving the second safety service messages to use the first channel to receive the second safety service messages.

Another example (e.g. example 24) relates to a previously-described example (e.g. one or more of examples 17-23), wherein the transmitter sequentially transmits the receiver configuration data using each of the plurality of channels by switching, after each receiver configuration data transmission, the channel from among the plurality of channels used to transmit the receiver configuration data.

An example (e.g. example 25) relates to a device. The device includes a transmitter means for transmitting data using a first frequency band in accordance with a first communication protocol; and a processing means for selecting at least one predetermined out of band emission protection mechanism based upon a detected number of device data transmissions over the first frequency band. The at least one predetermined out of band emission protection mechanisms respectively define one or more transmission parameters causing an aggregation of out of band emissions caused by the device data transmissions over the first frequency band, which are introduced into a second frequency band associated with a second communication protocol, to meet a predetermined out of band emission threshold requirement, and the processing means further causes the transmitter to use the selected one of the set of predetermined out of band emission protection mechanisms to transmit data over the first frequency band.

Another example (e.g. example 26) relates to a previously-described example (e.g. example 25), wherein the processing means selects, when the detected number of device data transmissions using the first frequency band is two or greater, a first one of the at least one predetermined out of band emission protection mechanisms that define one or more transmission parameters associated with a reduced transmission output power level for the transmitter.

Another example (e.g. example 27) relates to a previously-described example (e.g. one or more of examples 25-26), wherein the use of the first predetermined out of band emission protection mechanism results in the transmitter means reducing a transmission output power level.

Another example (e.g. example 28) relates to a previously-described example (e.g. one or more of examples 25-27), wherein the device is part of a wireless network that services the device and a further device, and wherein the number of device data transmissions over the first frequency band is detected via the further device and transmitted to the device.

Another example (e.g. example 29) relates to a previously-described example (e.g. one or more of examples 25-28), wherein the device is serviced by a wireless network, and wherein the number of device data transmissions over the first frequency band is detected via a network node of the wireless network and transmitted to the device.

Another example (e.g. example 30) relates to a previously-described example (e.g. one or more of examples 25-29), wherein the processing means further determines the reduced transmission output power level based upon a power spectral density (PSD) threshold requirement defined by the first communication protocol in accordance with data transmissions over the first frequency band.

Another example (e.g. example 31) relates to a previously-described example (e.g. one or more of examples 25-30), wherein the processing means selects a second one of the at least one predetermined out of band emission protection mechanisms when the use of the first predetermined out of band emission protection mechanism by the transmitter means results in the aggregation of out of band emissions caused by the device data transmissions over the first frequency band to exceed the predetermined out of band emission threshold requirement.

Another example (e.g. example 32) relates to a previously-described example (e.g. one or more of examples 25-31), wherein the second predetermined out of band emission protection mechanism defines one or more transmission parameters associated with a further reduced transmission output power level for the transmitter.

Another example (e.g. example 33) relates to a previously-described example (e.g. one or more of examples 25-32), wherein the second predetermined out of band emission protection mechanism defines one or more transmission parameters associated with a reduction in a frequency of data repetitively transmitted via the transmitter using the first frequency band.

An example (e.g. example 34) is a device. The device includes a transceiver means for transmitting data using a first frequency band in accordance with a first communication protocol; and processing means for: selecting at least one predetermined out of band emission protection mechanisms based upon an identified number of device data transmissions using the first frequency band in accordance with a first communication protocol, the number of device data transmissions being determined in accordance with a transmission schedule. The at least one predetermined out of band emission protection mechanisms define one or more one or more transmission parameters that cause an aggregation of out of band emissions caused by the device data transmissions over the first frequency band, which are introduced into a second frequency band associated with a second communication protocol, to meet a predetermined out of band emission threshold requirement. The transceiver means receives a control signal that causes the transceiver to use the selected at least one of the set of predetermined out of band emission protection mechanisms to transmit data over the first frequency band.

Another example (e.g. example 35) relates to a previously-described example (e.g. example 34), wherein the processing means selects, when the identified number of device data transmissions using the first frequency band is two or greater, a first one of the at least one predetermined out of band emission protection mechanisms that define one or more transmission parameters associated with a reduced transmission output power level for the transceiver means.

Another example (e.g. example 36) relates to a previously-described example (e.g. one or more of examples 34-35), wherein the selection of the first predetermined out of band emission protection mechanism results in the transceiver means reducing a transmission output power level for transmitting data using the first frequency band.

Another example (e.g. example 37) relates to a previously-described example (e.g. one or more of examples 34-36), wherein the reduced transmission output power level is based upon a power spectral density (PSD) threshold requirement defined by the first communication protocol in accordance with data transmissions over the first frequency band.

Another example (e.g. example 38) relates to a previously-described example (e.g. one or more of examples 34-37), wherein the processing means selects a second one of the at least one predetermined out of band emission protection mechanisms when the use of the first predetermined out of band emission protection mechanism by the transceiver results in the aggregation of out of band emissions caused by the device data transmissions over the first frequency band to exceed the predetermined out of band emission threshold requirement.

Another example (e.g. example 39) relates to a previously-described example (e.g. one or more of examples 34-38), wherein the second predetermined out of band emission protection mechanism defines one or more transmission parameters associated with a further reduced transmission output power level for the transceiver means.

Another example (e.g. example 40) relates to a previously-described example (e.g. one or more of examples 34-39), wherein the second predetermined out of band emission protection mechanism defines one or more transmission parameters associated with a reduction in a frequency of data repetitively transmitted via the transceiver means using the first frequency band.

An example (e.g. example 41) relates to a device. The device includes a transmitter means for transmitting first safety service messages and second safety service messages in accordance with a communication protocol that defines a plurality of channels, the first safety service messages being transmitted with a lower latency requirement than the second safety service messages; and processing means for causing the transmitter means to transmit the first and second safety service messages in accordance with a transmission schedule that results in the transmitter means (i) transmitting each respective one of the first safety service messages using a respective one of the plurality of channels, and (ii) sequentially transmitting each respective one of the second safety service messages using a first channel from among the plurality of channels.

Another example (e.g. example 42) relates to a previously-described example (e.g. example 41), wherein the transmission schedule results in the transmitter means transmitting the first safety service messages simultaneously via each respective one of the plurality of channels.

Another example (e.g. example 43) relates to a previously-described example (e.g. one or more of examples 41-42), wherein the transmission schedule results in the transmitter means transmitting the first safety service messages sequentially via each of the plurality of channels such that a portion of at least two of the first safety service messages overlap in time with one another on different channels from among the plurality of channels.

Another example (e.g. example 44) relates to a previously-described example (e.g. one or more of examples 41-43), wherein the processing means causes the device to perform a Listen Before Talk (LBT) operation on each one of the plurality of channels in accordance with the communication protocol, and to causes the transmitter means to transmit the first safety service messages sequentially via each of the plurality of channels by determining channel availability on each one of the plurality of channels in accordance with the LBT operation.

Another example (e.g. example 45) relates to a previously-described example (e.g. one or more of examples 41-44), wherein the transmission schedule results in the transmitter means transmitting the first safety service messages sequentially via each of the plurality of transmission channels such that none of the redundant first safety service messages overlap in time with one another.

Another example (e.g. example 46) relates to a previously-described example (e.g. one or more of examples 41-45), wherein the transmission schedule results in the transmitter means repeatedly transmitting the second safety service messages on the first channel in accordance with a safety service message transmission frequency as defined by the communication protocol.

Another example (e.g. example 47) relates to a previously-described example (e.g. one or more of examples 41-46), wherein the transmission schedule further results in the transmitter means sequentially transmitting receiver configuration data using each of the plurality of channels in accordance with a receiver configuration transmission frequency that is higher than the safety service message transmission frequency, the receiver configuration data instructing another device receiving the second safety service messages to use the first channel to receive the second safety service messages.

Another example (e.g. example 48) relates to a previously-described example (e.g. one or more of examples 41-47), wherein the transmitter means sequentially transmits the receiver configuration data using each of the plurality of channels by switching, after each receiver configuration data transmission, the channel from among the plurality of channels used to transmit the receiver configuration data.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A device, comprising:
a transmitter configured to transmit data using a first frequency band in accordance with a first communication protocol; and
processing circuitry configured to select, from among a set of different types of predetermined out of band emission protection mechanisms, one or more predetermined out of band emission protection mechanisms based upon a detected number of device data transmissions over the first frequency band, wherein the one or more predetermined out of band emission protection mechanisms respectively define one or more transmission parameters causing an aggregation of out of band emissions caused by the device data transmissions over the first frequency band, which are introduced into a second frequency band associated with a second communication protocol, to meet a predetermined out of band emission threshold requirement, and
wherein the processing circuitry is further configured to cause the transmitter to use the selected one or more predetermined out of band emission protection mechanisms to transmit data over the first frequency band.

2. The device of claim 1, wherein the processing circuitry is configured to select, when the detected number of device data transmissions using the first frequency band is two or greater, a first one of the one or more predetermined out of band emission protection mechanisms that define one or more transmission parameters associated with a reduced transmission output power level for the transmitter.

3. The device of claim 1, wherein the use of a first one of the one or more predetermined out of band emission protection mechanisms results in the transmitter reducing a transmission output power level to provide a reduced transmission output power level.

4. The device of claim 3, wherein the processing circuitry is further configured to determine the reduced transmission output power level based upon a power spectral density (PSD) threshold requirement defined by the first communication protocol in accordance with data transmissions over the first frequency band.

5. The device of claim 1, wherein the device is part of a wireless network that services the device and a further device, and
wherein the number of device data transmissions over the first frequency band is detected via the further device and transmitted to the device.

6. The device of claim 1, wherein the device is serviced by a wireless network, and
wherein the number of device data transmissions over the first frequency band is detected via a network node of the wireless network and transmitted to the device.

7. The device of claim 2, wherein the processing circuitry is configured to select a second one of the one or more predetermined out of band emission protection mechanisms when the use of the first predetermined out of band emission protection mechanism by the transmitter results in the aggregation of out of band emissions, caused by the device data transmissions over the first frequency band, to exceed the predetermined out of band emission threshold requirement.

8. The device of claim 7, wherein the second predetermined out of band emission protection mechanism defines one or more transmission parameters associated with a further reduced transmission output power level for the transmitter.

9. The device of claim 7, wherein the second predetermined out of band emission protection mechanism defines one or more transmission parameters associated with a reduction in a frequency of data repetitively transmitted via the transmitter using the first frequency band.

10. A device, comprising:
a transceiver configured to transmit data using a first frequency band in accordance with a first communication protocol; and
processing circuitry configured to:
select, from among a set of different types of predetermined out of band emission protection mechanisms, one or more predetermined out of band emission protection mechanisms based upon an identified number of device data transmissions using the first frequency band in accordance with the first communication protocol, the number of device data transmissions being determined in accordance with a transmission schedule, wherein the one or more predetermined out of band emission protection mechanisms define one or more transmission parameters that cause an aggregation of out of band emissions caused by the device data transmissions over the first frequency band, which are introduced into a second frequency band associated with a second communication protocol, to meet a predetermined out of band emission threshold requirement, and wherein the transceiver is configured to receive a control signal that causes the transceiver to use the selected one or more predetermined out of band emission protection mechanisms to transmit data over the first frequency band.

11. The device of claim 10, wherein the processing circuitry is configured to select, when the identified number of device data transmissions using the first frequency band is two or greater, a first one of the one or more predetermined out of band emission protection mechanisms that define one or more transmission parameters associated with a reduced transmission output power level for the transceiver.

12. The device of claim 11, wherein the processing circuitry is configured to select a second one of the one or more predetermined out of band emission protection mechanisms when the use of the first predetermined out of band emission protection mechanism by the transceiver results in the aggregation of out of band emissions, caused by the device data transmissions over the first frequency band, to exceed the predetermined out of band emission threshold requirement.

13. The device of claim 12, wherein the second predetermined out of band emission protection mechanism defines one or more transmission parameters associated with a further reduced transmission output power level for the transceiver.

14. The device of claim 12, wherein the second predetermined out of band emission protection mechanism defines one or more transmission parameters associated with a reduction in a frequency of data repetitively transmitted via the transceiver using the first frequency band.

15. The device of claim 10, wherein the selection of a first one of the one or more predetermined out of band emission protection mechanisms results in the transceiver reducing a transmission output power level for transmitting data using the first frequency band to provide a reduced transmission output power level.

16. The device of claim 15, wherein the reduced transmission output power level is based upon a power spectral density (PSD) threshold requirement defined by the first communication protocol in accordance with data transmissions over the first frequency band.

17. A device, comprising:
a transmitter configured to transmit first safety service messages and second safety service messages in accordance with a communication protocol that defines a plurality of channels, the first safety service messages being transmitted with a lower latency requirement than the second safety service messages; and processing circuitry configured to cause the transmitter to transmit the first and second safety service messages in accordance with a transmission schedule that results in the transmitter (i) transmitting each respective one of the first safety service messages using a respective one of the plurality of channels, and (ii) sequentially transmitting each respective one of the second safety service messages using a first channel from among the plurality of channels.

18. The device of claim 17, wherein the transmission schedule results in the transmitter transmitting the first safety service messages simultaneously via each respective one of the plurality of channels.

19. The device of claim 17, wherein the transmission schedule results in the transmitter transmitting the first safety service messages sequentially via each of the plurality of channels such that a portion of two or more of the first safety service messages overlap in time with one another on different channels from among the plurality of channels.

20. The device of claim 19, wherein the processing circuitry is configured to cause the device to perform a Listen Before Talk (LBT) operation on each one of the plurality of channels in accordance with the communication protocol, and to cause the transmitter to transmit the first safety service messages sequentially via each of the plurality of channels by determining channel availability on each one of the plurality of channels in accordance with the LBT operation.

21. The device of claim 17, wherein the transmission schedule results in the transmitter transmitting the first safety service messages sequentially via each of the plurality of channels such that none of the first safety service messages overlap in time with one another.

22. The device of claim 17, wherein the transmission schedule results in the transmitter repeatedly transmitting the second safety service messages on the first channel in accordance with a safety service message transmission frequency as defined by the communication protocol.

23. The device of claim 22, wherein the transmission schedule further results in the transmitter sequentially transmitting receiver configuration data using each of the plurality of channels in accordance with a receiver configuration transmission frequency that is higher than the safety service message transmission frequency, the receiver configuration data instructing another device receiving the second safety service messages to use the first channel to receive the second safety service messages.

24. The device of claim 23, wherein the transmitter sequentially transmits the receiver configuration data using each of the plurality of channels by switching, after each receiver configuration data transmission, the channel from among the plurality of channels used to transmit the receiver configuration data.

\* \* \* \* \*